(12) United States Patent
Subbiah et al.

(10) Patent No.: US 10,567,308 B1
(45) Date of Patent: Feb. 18, 2020

(54) VIRTUAL MACHINE VIRTUAL FABRIC LOGIN SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/259,292

(22) Filed: Jan. 28, 2019

(51) Int. Cl.
*H04L 12/931* (2013.01)
*G06F 9/455* (2018.01)
*H04L 29/08* (2006.01)
*H04L 12/937* (2013.01)
*H04B 10/50* (2013.01)
*H04B 10/00* (2013.01)
*H04B 10/25* (2013.01)
*H04B 10/40* (2013.01)
(Continued)

(52) U.S. Cl.
CPC ........ *H04L 49/357* (2013.01); *G06F 9/45558* (2013.01); *H04L 49/253* (2013.01); *H04L 49/354* (2013.01); *H04L 67/1097* (2013.01); *H04B 10/00* (2013.01); *H04B 10/12* (2013.01); *H04B 10/14* (2013.01); *H04B 10/142* (2013.01); *H04B 10/152* (2013.01); *H04B 10/225* (2013.01); *H04B 10/25* (2013.01); *H04B 10/2503* (2013.01); *H04B 10/40* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS

2002/0034178 A1\* 3/2002 Schmidt ............ H04L 29/12009
370/386
2003/0084219 A1\* 5/2003 Yao ......................... H04L 29/06
710/300

(Continued)

OTHER PUBLICATIONS

Fibre Channel Physical and Signaling Interface (FC-PH), dated Jun. 1, 1994, American National Standards Institute, X3T11/Project 755D/Rev 4.3 (Year: 1994).\*

(Continued)

*Primary Examiner* — Darren E Wolf
(74) *Attorney, Agent, or Firm* — Haynes and Boone, LLP

(57) ABSTRACT

A virtual fabric login system includes a FC networking device that provides access to a plurality of virtual fabrics, a server device that provides a plurality of virtual machines, and a FCF device that is coupled to a physical server device port included on the server device and coupled to the FC networking device. The FCF device receives, via the physical server device port, first traffic from a first virtual machine and includes a first virtual machine identifier that identifies the first virtual machine. The FCF device determines, using a virtual-machine-to-virtual-fabric mapping, that the first virtual machine identifier is associated with a first virtual fabric identifier that identifies a first virtual fabric included in the plurality of virtual fabrics and tags the first traffic with the first virtual fabric identifier. The FCF device then transmits the tagged first traffic to the FC networking device.

20 Claims, 14 Drawing Sheets

(51) Int. Cl.
*H04B 10/43* (2013.01)
*H04B 10/60* (2013.01)

(56) References Cited

U.S. PATENT DOCUMENTS

| | | | | |
|---|---|---|---|---|
| 2010/0070722 A1* | 3/2010 | Otani | ............... | G06F 3/0607 |
| | | | | 711/162 |
| 2010/0226281 A1* | 9/2010 | Ghosh | ............... | H04L 12/56 |
| | | | | 370/254 |
| 2011/0085557 A1* | 4/2011 | Gnanasekaran | ...... | H04L 45/583 |
| | | | | 370/401 |
| 2011/0243134 A1* | 10/2011 | Armstrong | ............. | H04L 45/66 |
| | | | | 370/392 |

OTHER PUBLICATIONS

Fibre Channel Framing and Signaling—4 (FC-FS-4), Rev 1.41, Jun. 28, 2016, American National Standard for Information Technology, T11/16-291v0 (Year: 2016).*

Zoltán Meggyesi entitled Fibre Channel Overview, KFKI—RMKI, Research Institute for Particle and Nuclear Physics, H-1525 Budapest, POB 49, Hungary, (http://hsi.web.cern.ch/HSI/fcs/spec/overview.htm), Aug. 15, 1994 (Year: 1994).*

* cited by examiner

VIRTUAL MACHINE VIRTUAL FABRIC LOGIN SYSTEM

BACKGROUND

The present disclosure relates generally to information handling systems, and more particularly to logging virtual machines provided by information handling systems into virtual fabrics.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are configured to provide a Fibre Channel (FC) Storage Area Network (SAN) for the storage of data. In such systems, an FC switch device may be utilized to couple the FC SAN to server devices via a Fibre Channel Forwarder (FCF) device that performs FC over Ethernet (FCoE)-to-FC protocol conversions on Ethernet communications sent from the server devices to the FC SAN, as well as FC-to-FCoE protocol conversions on FC communications sent from the FC SAN to the server devices. Such FCF devices allow server devices that communicate via the Ethernet protocol to utilize FC SANs that communicate via the FC protocol. Furthermore, the FC switch device may be partitioned into, or provide access to, one or more logical FC switch devices that are each assigned to a logical (virtual) fabric (e.g., Virtual Local Area Network (VLAN) and/or a Virtual Storage Area Network (VSAN)). Further still, server devices may include a hypervisor such as an Elastic Sky X integrated (ESXi) hypervisor provided by VMWARE® Inc. of Palo Alto, Calif., United States, such that the server device may be partitioned in one or more virtual machines.

In conventional systems that provide a first virtual machine on the server device that logs in to a first virtual fabric and a second virtual machine on the server device that logs in to a second virtual fabric, that server device is required to have two converged network adapters (CNAs) or two host bus adapters (HBAs), as each adapter is only capable of logging in to one fabric at a time. As such, if there is only one CNA/HBA, the first virtual machine and the second virtual machine may only operate via the one fabric to which the CNA/HBA is logged in. Thus, to communicate with multiple virtual fabrics, conventional server devices require an adapter for each virtual fabric, which can lead to under-utilization of bandwidth on the adapters and excess hardware, particularly when the traffic routed between the virtual machines and their separate virtual fabrics via the separate adapters could be handled by fewer adapters.

Accordingly, it would be desirable to provide an improved virtual machine virtual fabric login system.

SUMMARY

According to one embodiment, an Information Handling System (IHS) includes a plurality of ports; a processing system that is coupled to the plurality of ports; and a memory system that is coupled to the processing system and that includes instructions that, when executed by the processing system, cause the processing system to provide an N_Port ID Virtualization (NPIV) Proxy Gateway (NPG) engine that is configured to: receive, from a physical server device port on a server device that includes a hypervisor that is configured to provide a plurality of virtual machines and via a first port of the plurality of ports, first traffic from a first virtual machine that is included in the plurality of virtual machines, wherein the first traffic includes a first virtual machine identifier that identifies the first virtual machine; determine, using the first virtual machine identifier and a virtual machine-to-virtual fabric mapping, that the first virtual machine identifier is associated with a first virtual fabric identifier that identifies a first virtual fabric of a plurality of virtual fabrics accessible through a Fibre Channel (FC) networking device; tag the first traffic with the first virtual fabric identifier to provide tagged first traffic; and transmit, via a second port of the plurality of ports to an FC networking device port of the FC networking device, the tagged first traffic.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
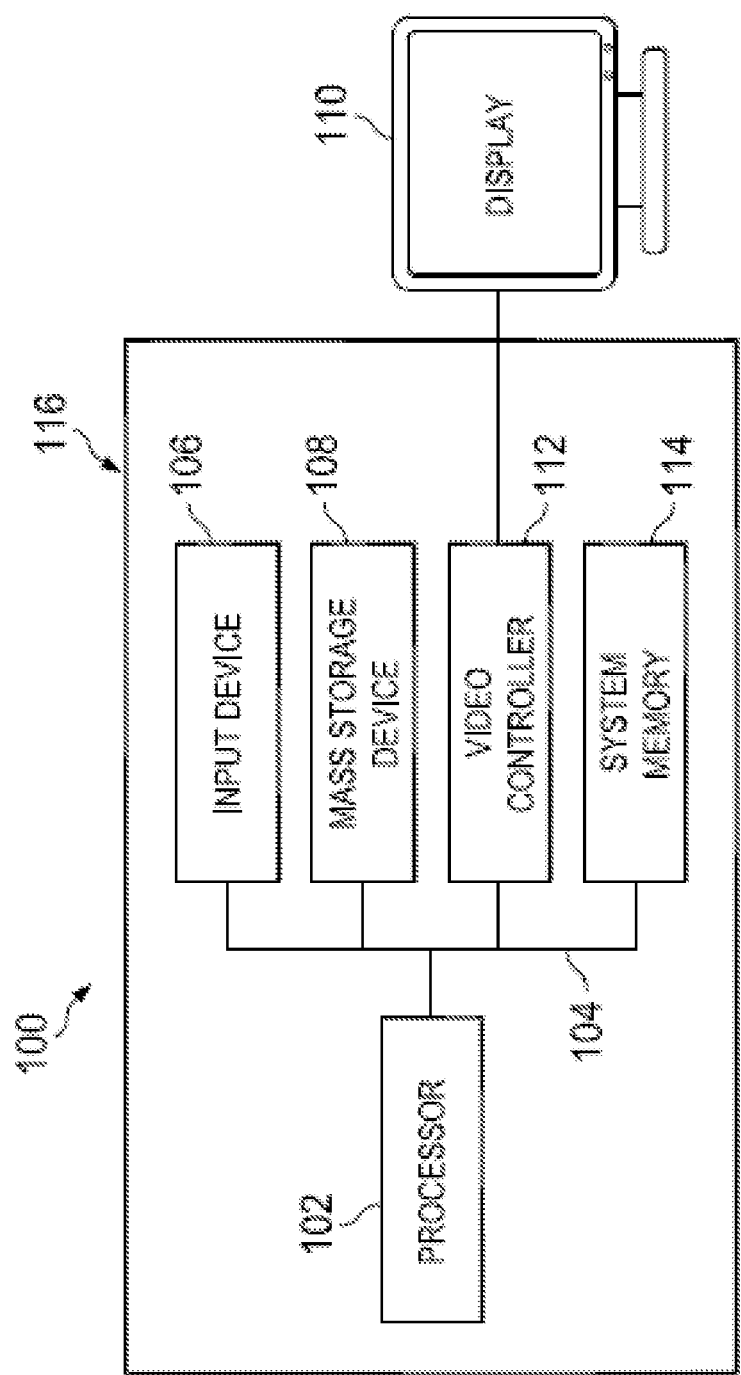
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
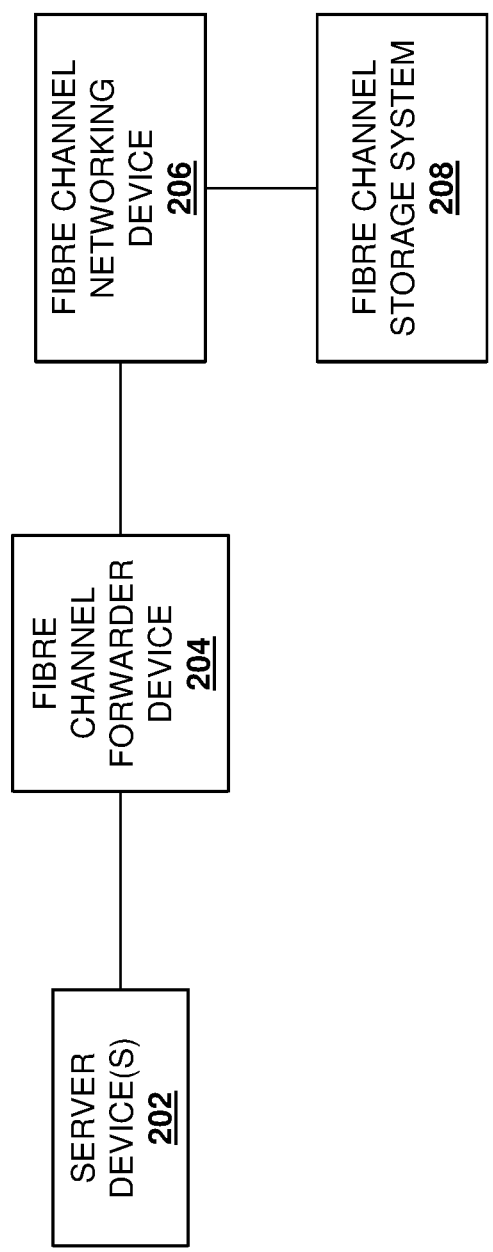
FIG. 2 is a schematic view illustrating an embodiment of a virtual fabric login system.

Referring now to FIG. 2, an embodiment of a virtual fabric login system 200 is illustrated. In the illustrated embodiment, the virtual fabric login system 200 includes one or more server devices 202 that may be provided by the IHS 100 discussed above with reference to FIG. 1 and/or that may include some or all of the components of the IHS 100. For example, the server device(s) 202 may be one or more servers in a server rack or server chassis, and one of skill in the art in possession of the present disclosure will recognize that any number of servers may be provided in the virtual fabric login system 200 and may operate similarly to the server devices discussed below. In the illustrated embodiment, the server device 202 is coupled to a Fibre Channel Forwarder (FCF) device 204 that may be provided by the IHS 100 discussed above with reference to FIG. 1 and/or that may include some or all of the components of the IHS 100. For example, the FCF device 204 may be provided by a switch or other networking device that is configured to receive Ethernet communications from the server device 202, convert those Ethernet communications to Fibre Chanel (FC) communications for forwarding to an FC Storage Area Network (SAN), receive FC communications from the FC SAN, convert those FC communications to Ethernet communications for forwarding to the server device 202, and/or perform other FCF device functionality know in the art.

In the illustrated embodiment, the FCF device 204 is coupled to an FC networking device 206 that may be provided by the IHS 100 discussed above with reference to FIG. 1 and/or that may include some or all of the components of the IHS 100. For example, the FC networking device 206 may be provided by an FC switch device that is configured to receive FC communications (e.g., initiated by the server device 202) from the FCF device 204, log the server device into an FC SAN, subsequently receive FC communications (e.g., initiated by the server device 202) from the FCF device 204, transmit those FC communications to the FC SAN to allow the server device 202 to communicate with the FC SAN, and perform a variety of other FC networking device functionality that would be apparent to one of skill in the art in possession of the present disclosure.

In the illustrated embodiment, the FC networking device 206 is coupled to an FC storage system 208 that may be provided by one or more of the IHS 100 discussed above with reference to FIG. 1 and/or that may include some or all of the components of the IHS 100. For example, the FC storage system 208 may be provided by a FC SAN that is configured to receive FC communications from the server device 202 through the FC networking device 206 and the FCF device 204, send FC communications to the server devices 202a-202c through the FC networking device 206 and the FCF device 204, and/or perform a variety of other FC storage system functionality that would be apparent to one of skill in the art in possession of the present disclosure. However, while a specific virtual fabric login system 200 is illustrated and described below, one of skill in the art in possession of the present disclosure will recognize that the teachings of the present disclosure will be beneficial for a variety of virtual fabric login systems that would be apparent to one of skill in the art in possession of the present disclosure and, as such, a wide variety of modifications to the number, types, and configurations of devices in the virtual fabric login system 200 will fall within the scope of the present disclosure as well.

Figure 3:
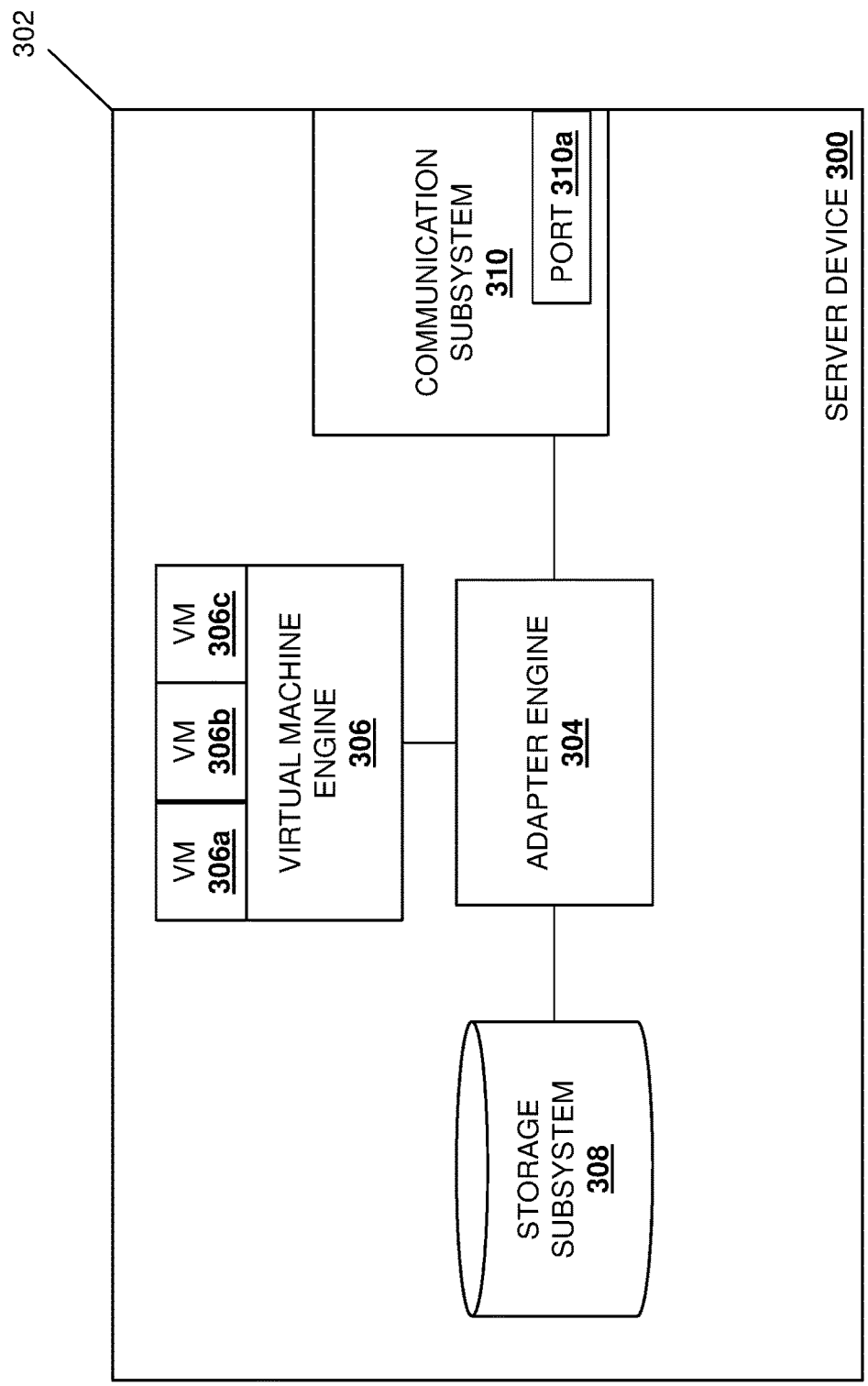
FIG. 3 is a schematic view illustrating an embodiment of a server device provided in the virtual fabric login system of FIG. 2.

Referring now to FIG. 3, an embodiment of a server device 300 is illustrated that may provide any of the server device(s) 202 discussed above with reference to FIG. 2. As such, the server device 300 may be provided by the IHS 100 discussed above with reference to FIG. 1 and/or may include some or all of the components of the IHS 100, and in specific examples may provide one or more servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 and a virtual machine engine 306 that are configured to perform the functions of the adapter engines, virtual machine engines, and server devices discussed below. As illustrated, the virtual machine engine 306 (e.g., a hypervisor such as the ESXi discussed above, any other hypervisor that utilizes raw device mapping (RDM) functionality and/or any other virtual machine manager that would be apparent to one of skill in the art in possession of the present disclosure) may partition the resources (e.g., the memory system, the processing system, a communication system, a storage system, etc.) of the server device 300 such that a virtual machine 306a, a virtual machine 306b, and a virtual machine 306c are created and executed by the virtual machine engine 306 that runs on hardware and/or an operating system of the server device 300.

The chassis 302 may also house a storage system 308 (not illustrated, but which may include the storage device 108 discussed above with reference to FIG. 1) that is coupled to the adapter engine 304 (e.g., via a coupling between the storage system and the processing system), and that is configured to store the data utilized by the adapter engine 304 as discussed below. However, in some embodiments the storage subsystem 308 may be omitted. The chassis 302 may also house a communication subsystem 310 that is coupled to the adapter engine 304 (e.g., via a coupling between the communication subsystem 310 and the processing system) and that may include a Network Interface Controller (NIC), a wireless communication device, one or more ports (e.g., the physical server port 310a illustrated in FIG. 3), and/or any other communication components that would be apparent to one of skill in the art in possession of the present disclosure. Furthermore, in some embodiments, components of the adapter engine 304 and/or the communication subsystem 310 may be provided by a Converged Network Adapter (CNA) that is configured to perform the functionality of the adapter engines and/or server devices discussed below. However, in other embodiments, the adapter engine 304 and/or communication subsystem 310 may be utilized to provide other types of adapters (e.g., Host Bus Adapters (HBAs)) while remaining within the scope of the present disclosure as well. While a specific server device 300 has been described, one of skill in the art in possession of the present disclosure will recognize that the server device 300 may include a variety of other components and/or component configurations for performing conventional server device functionality, as well as the functionality described below, while remaining within the scope of the present disclosure.

Figure 4:
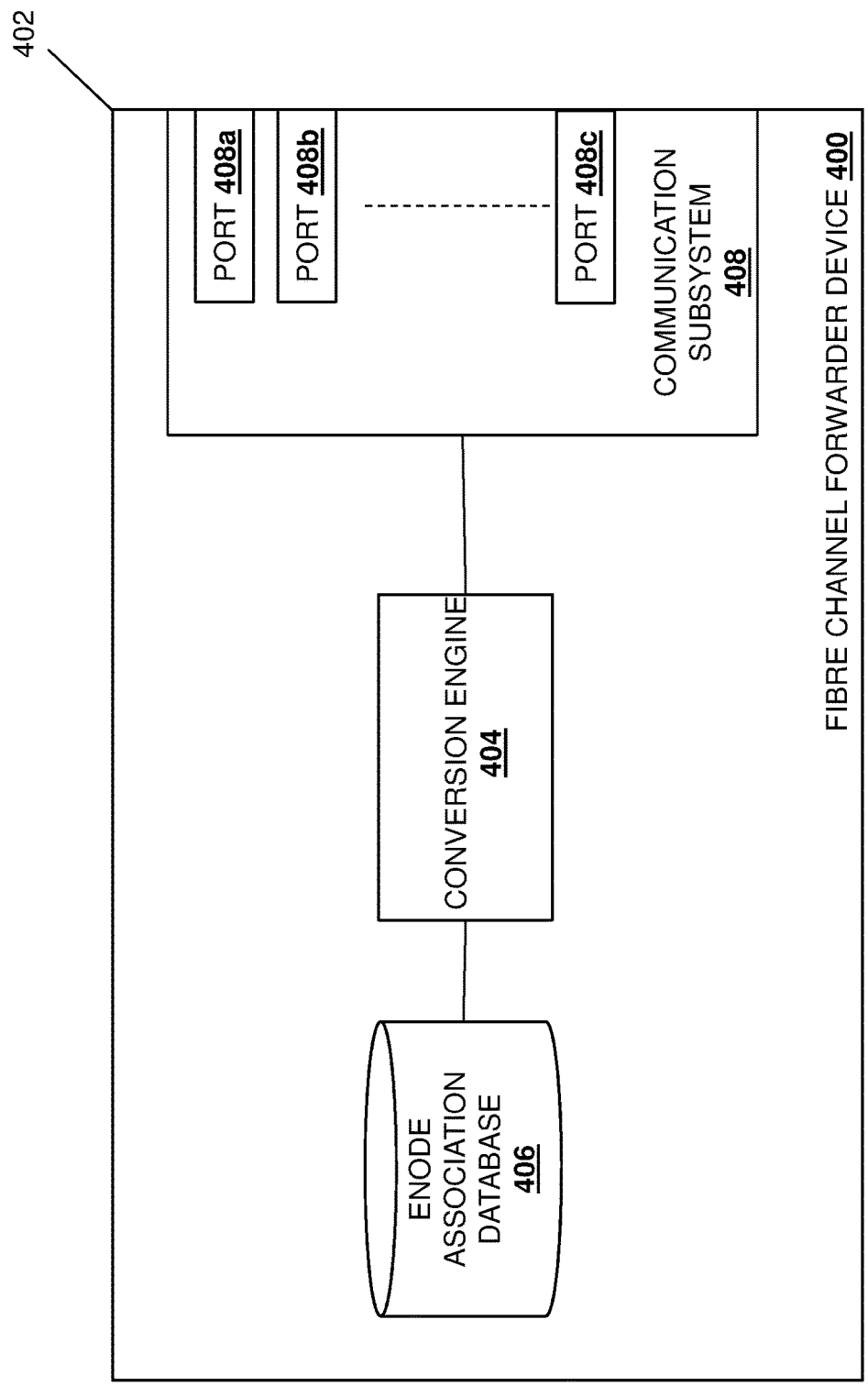
FIG. 4 is a schematic view illustrating an embodiment of a Fibre Channel Forwarder (FCF) device provided in the virtual fabric login system of FIG. 2.

Referring now to FIG. 4, an embodiment of a Fibre Channel Forwarder (FCF) device 400 is illustrated that may provide the FCF device 204 discussed above with reference to FIG. 2. As such, the FCF device 400 may be provided by the IHS 100 discussed above with reference to FIG. 1 and/or may include some or all of the components of the IHS 100, and in specific examples may be a switch device, a gateway device, or other networking devices that would be apparent to one of skill in the art in possession of the present disclosure. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well.

The chassis 402 may also house a storage system (not illustrated, but which may include the storage device 108 discussed above with reference to FIG. 1) that is coupled to the conversion engine 404 (e.g., via a coupling between the storage system and the processing system) and that may include an FCF device database 406 that is configured to store the data utilized by the conversion engine 404 as discussed below. The chassis 402 may also house a communication subsystem 408 that is coupled to the conversion engine 404 (e.g., via a coupling between the communication subsystem 408 and the processing system) and that may include a Network Interface Controller (NIC), a Fibre Channel interface, a wireless communication device, ports, and/or other communication components that would be apparent to one of skill in the art in possession of the present disclosure. For example, in the illustrated embodiment, the communication subsystem 408 includes a plurality of ports (e.g., the FCF device ports 408a, 408b, and up to 408c illustrated in FIG. 4) that may be coupled to an FC networking device, another FCF device, and/or a server device as discussed below. Furthermore, in some embodiments, components of the conversion engine 404 and/or the communication subsystem 408 may provide an NPG that performs the functionality of the conversion engines and/or FCF devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components and/or component configurations for performing conventional FCF device functionality, as well as the functionality described below, while remaining within the scope of the present disclosure.

Figure 5:
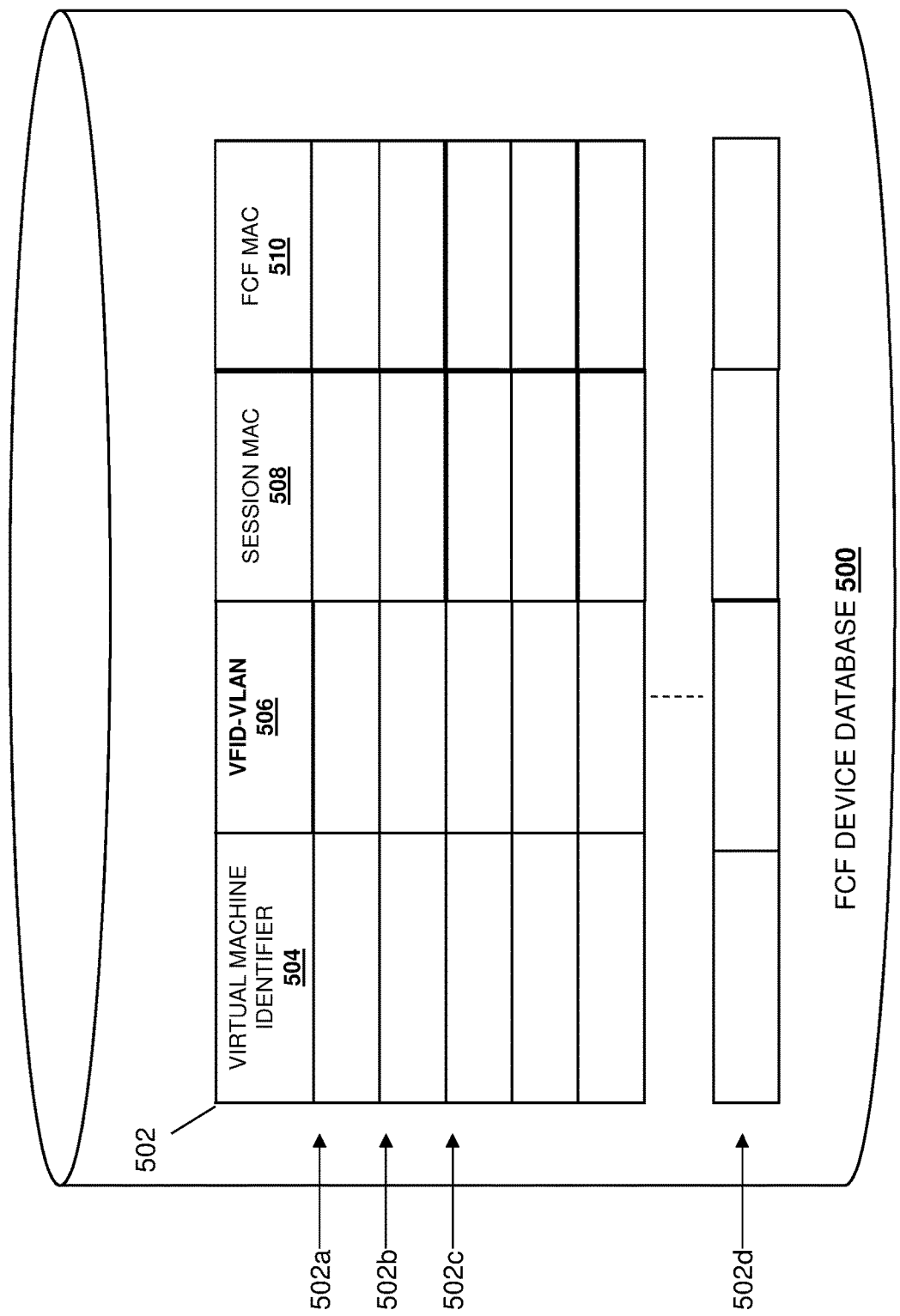
FIG. 5 is a schematic view illustrating an embodiment of an FCF device database provided in the FCF device of FIG. 4.

Referring now to FIG. 5, an embodiment of an FCF device database 500 is illustrated. In an embodiment, the FCF device database 500 may be the FCF device database 406 discussed above with reference to FIG. 4. In a specific example, the FCF device database 500 may include a virtual-machine-to-virtual-fabric mapping table 502 that may identify virtual machines along with the virtual fabric (e.g., a VSAN and/or VLAN) to which those virtual machines are logged in, and may be used by the FCF device 400 when handling traffic received from the virtual machines 306a-306c hosted on the server device 202. In some examples, the virtual-machine-to-virtual-fabric mapping table 502 may be based on virtual fabric zoning provided in the FC networking device 206, as discussed in further detail below. The virtual-machine-to-virtual-fabric mapping table 502 may include virtual-machine-to-virtual-fabric mapping table entries 502a, 502b, 502c, and up to 502d.

For example, for each virtual-machine-to-virtual-fabric mapping table entry 502a-d, the virtual-machine-to-virtual-fabric mapping table 502 may include a virtual machine identifier column 504 that is configured to include a virtual machine identifier (e.g., a Fiber Channel Identifier (FCID) and/or a port worldwide name (PWWN) assigned to a virtual node port (vN_Port) on a virtual machine) for one of the virtual machines 306a-306c and/or one of the virtual ports of those virtual machines 306a-306c. In some examples the virtual machine identifier may be provided by the FCID (e.g., an N_Port ID) that includes a 24-bit value that the FC networking device 206 (or a virtual FC networking device in a virtual fabric) assigns to an N_Port or VN_Port on the server device as a unique identifier within a local FC network (i.e., an FC fabric). As such, the FCID may include an 8-bit domain value, an 8-bit area value, and an 8-bit port value. However, one of skill in the art in possession of the present disclosure will recognize that other virtual machine identifiers for the virtual machines 306a-306c and/or the server device 300 may be used alternatively, or in addition to, the FCID. The virtual machine-to-virtual fabric mapping table 502 may also include a virtual fabric identifier to virtual local area network (VF_ID-VLAN) mapping column 506 that is configured to include a virtual fabric identifier (VF_ID) for one of the virtual fabrics 605a-606d discussed below and a VLAN for that VF_ID. In some examples, the virtual-machine-to-virtual-fabric mapping table 502 may also include a session Machine Access Control (MAC) column 508 that is configured to include a session MAC that identifies each login process (e.g., FLOGI/FDISC login processes) performed by the virtual machines 306a-306c for their respective virtual fabric. In addition, the virtual-machine-to-virtual-fabric mapping table 502 illustrated in FIG. 5 may include an FCF MAC column 510 that is configured to include the FCF MAC that is associated with each virtual fabric identifier in the VFID-VLAN column 506. Each virtual fabric includes its own FCF MAC. In the present disclosure, the virtual machines 306a-306c are not always aware of the FCF MAC of the virtual fabric to which they are logged in. Therefore, virtual machines 306a-306c destine their traffic to a default FCF MAC. The FCF device 400 can replace the default FCF MAC with the FCF MAC for the virtual fabric to which a virtual machine 306a-306c is logged in to.

Figure 6:
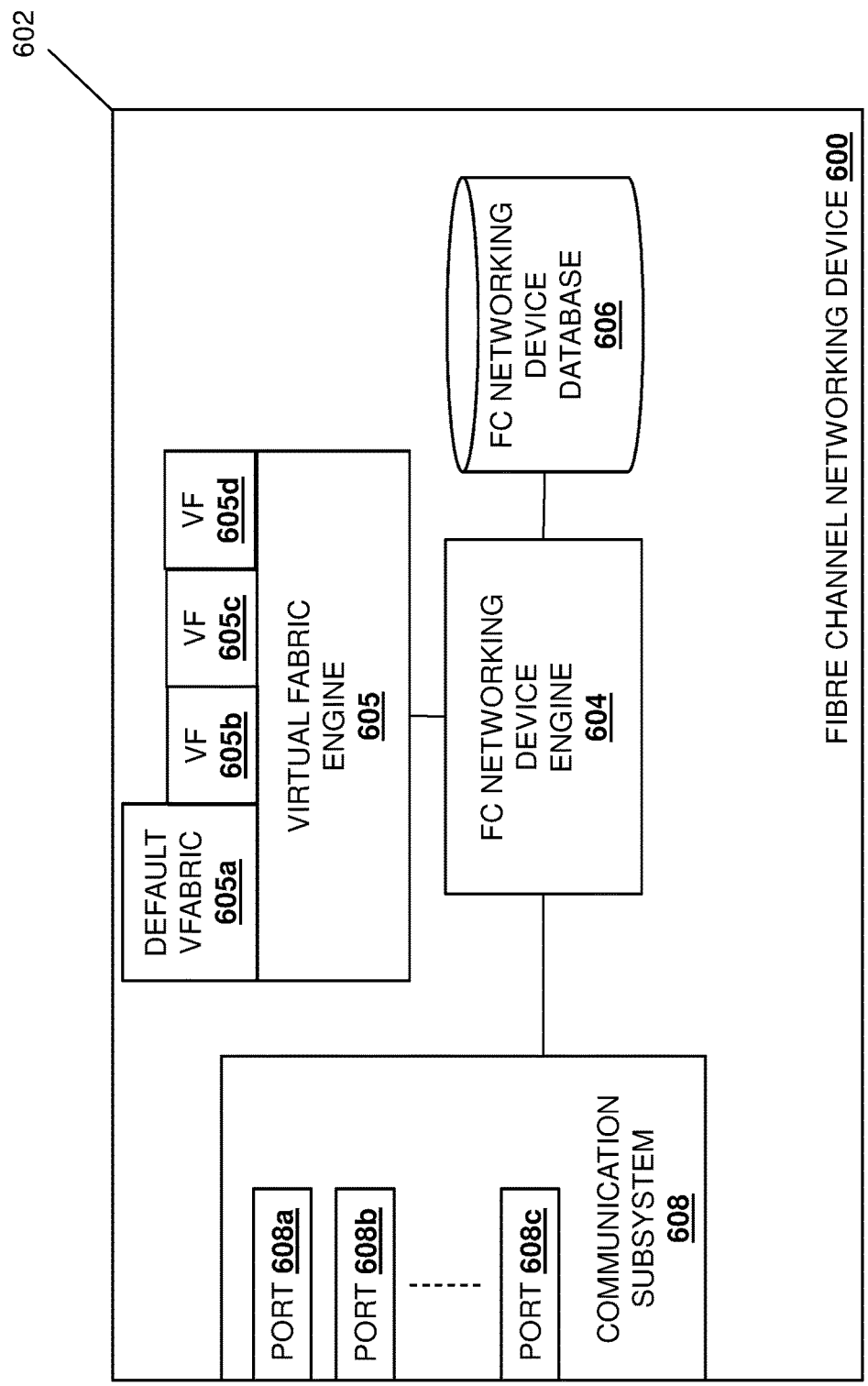
FIG. 6 is a schematic view illustrating an embodiment of a Fibre Channel (FC) networking device provided in the virtual fabric login system of FIG. 2.

Referring now to FIG. 6, an embodiment of a Fibre Channel (FC) networking device 600 is illustrated that may provide by the FC networking device 206 discussed above with reference to FIG. 2. As such, the FC networking device 600 may be the IHS 100 discussed above with reference to FIG. 1 and/or may include some or all of the components of the IHS 100, and in specific examples may be an FC switch. In the illustrated embodiment, the FC networking device 600 includes a chassis 602 that houses the components of the FC networking device 600, only some of which are illustrated in FIG. 6. For example, the chassis 602 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FC networking device engine 604 and a virtual fabric engine 605 that are configured to perform the functions of the FC networking device engines, virtual fabric engines, and FC networking devices discussed below.

As illustrated, the virtual fabric engine 605 may partition the resources (e.g., the memory system, the processing system, a communication system, a storage system, etc.) of the FC networking device 600 such that a default virtual fabric 605a, a virtual fabric 605b, a virtual fabric 605c, and up to a virtual fabric 605d are created and executed by the virtual fabric engine 605 that runs on hardware and/or an operating system of the FC networking device 600. However, one of skill in the art in possession of the present disclosure will recognize that the virtual fabric engine 605 may provide access to the default virtual fabric 605a and the virtual fabrics 605b-605d or any number of virtual fabrics while remaining within the scope of the present disclosure as well. As would be understood by one of skill in the art in possession of the present disclosure, a virtual fabric may include a VLAN and/or a VSAN that are accessible via a collection of ports on a set of connected FC switch devices, and that form a virtual fabric. For example, ports on a single FC networking device may be partitioned into multiple VSANs despite those ports sharing hardware resources. Conversely, multiple FC networking devices may join their ports to form a single VSAN. Each VSAN may provide a separate, self-contained fabric using distinctive security policies, zones, events, memberships, and name services. As such, traffic provided on the VSAN may also be separated. As would be appreciated by one of skill in the art in possession of the present disclosure, the use of VSANs allows for the isolation of traffic within specific portions of the network. As such, if a problem occurs in one VSAN, that problem can be handled with minimum disruption to the rest of the network, as VSANs may be configured separately and independently.

The chassis 602 may also house a storage system (not illustrated, but which may include the storage device 108 discussed above with reference to FIG. 1) that is coupled to the FC networking device engine 604 (e.g., via a coupling between the storage system and the processing system) and that may include an FC networking device database 606 that is configured to store the data utilized by the FC networking device engine 604 as discussed below. The chassis 602 may also house a communication subsystem 608 that is coupled to the FC networking device engine 604 and/or virtual fabric engine 605 (e.g., via a coupling between the communication subsystem 608 and the processing system) and that may include a Network Interface Controller (NIC), a wireless communication device, a Fibre Channel interface, ports, and/or other communication components that would be apparent to one of skill in the art in possession of the present disclosure. For example, in the illustrated embodiment, the communication subsystem 608 includes a plurality of FC networking device ports 608a, 608b, and up to 608c, which may be coupled to an FCF device, the FC storage system 208, and/or a virtual fabric as discussed herein. While a specific FC networking device 600 has been described, one of skill in the art in possession of the present disclosure will recognize that the FC networking device 600 may include a variety of other components and/or component configuration for performing conventional FC networking device functionality, as well as the functionality described below, while remaining within the scope of the present disclosure.

Figure 7:
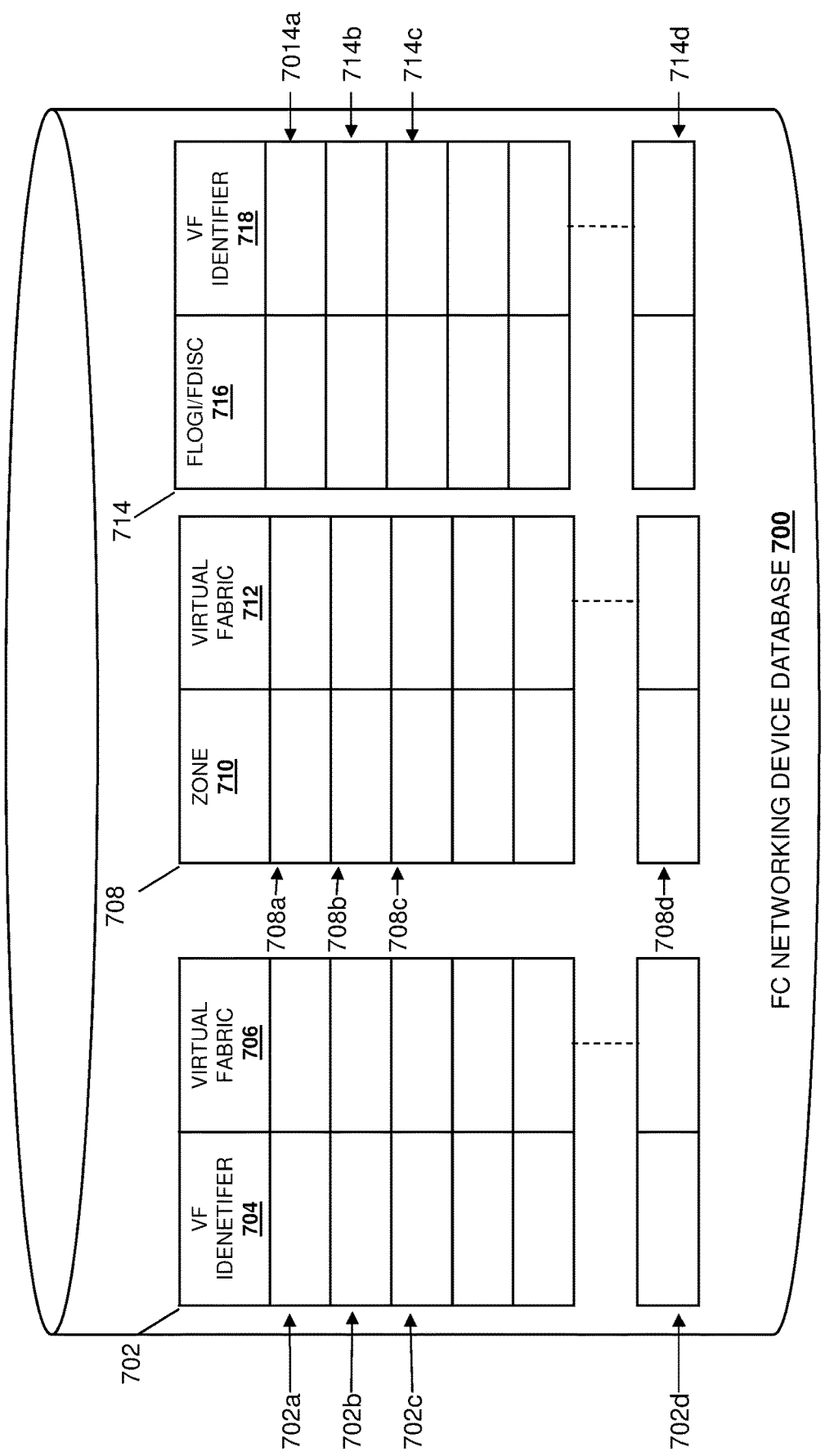
FIG. 7 is a schematic view illustrating an embodiment of an FC networking device database provided in the FC networking device of FIG. 6.

Referring now to FIG. 7, an embodiment of an FC networking device database 700 is illustrated. In an embodiment, the FC networking device database 700 may provide the FC networking device database 606 discussed above with reference to FIG. 6. In the illustrated example, the FC networking device database 700 includes a virtual-fabric-identifier-to-virtual-fabric mapping table 702 having virtual-fabric-identifier-to-virtual-fabric mapping table entries 702a, 702b, 702c, and up to 702d. For example, for each virtual-fabric-identifier-to-virtual-fabric mapping table entry 702a-702d, the virtual-fabric-identifier-to-virtual-fabric mapping table 702 may include a virtual fabric identifier column 704, a virtual fabric column 706, and/or other information columns that would be apparent to one of skill in the art in possession of the present disclosure. As discussed below, the virtual-fabric-identifier-to-virtual-fabric mapping table 702 may provide mappings of virtual fabric identifiers to virtual fabrics, which allows the default virtual fabric 605a to route the FDISC/VM logins of the virtual machines 306a-306c to the correct virtual fabric.

In the illustrated example, the FC networking device database 700 may include a zone-to-virtual fabric table 708 having zone-to-virtual-fabric table entries 708a, 708b, 708c, and up to 708d. For example, for each zone-to-virtual-fabric table entry 708a, 708b, 708c, and up to 708d, the zone-to-virtual-fabric table 708 may include a zone column 710, a virtual fabric column 712, and/or other information columns that would be apparent to one of skill in the art in possession of the present disclosure. The zone-to-virtual-fabric table entries 708a, 708b, 708c, and up to 708d may map zones of a virtual fabric to that virtual fabric so that the default virtual fabric 605a may identify the zones defined by each virtual fabric, as well as which virtual fabrics those zones belong to, so that the default virtual fabric 605a may provide the FDISCs received from virtual machines to the appropriate virtual fabric according to which zone the virtual machine is assigned.

In the illustrated example, the FC networking device database 700 may include a device-login-to-virtual-fabric identifier table 714 having device-login-to-virtual-fabric identifier table entries 714a, 74b, 714c, and up to 714d. For example, for each device-login-to-virtual-fabric identifier table entry 714a, 714b, 714c, and up to 714d, the device-login-to-virtual-fabric identifier table 714 may include a device login column 716, a virtual fabric identifier column 718, and/or other information columns that would be apparent to one of skill in the art in possession of the present disclosure. The device-login-to-virtual-fabric identifier table entries 714a, 714b, 714c, and up to 714d may map each login to the virtual fabrics 605a-605d to a virtual fabric identifier. While a specific example of the FC networking device database 700 is illustrated, one of skill in the art in possession of the present disclosure will recognize that the FC networking device database 700 and/or the virtual-fabric-identifier-to-virtual-fabric mapping table 702 may include and/or store other information to enable the functionality discussed below while remaining within the scope of the present disclosure.

Figure 8:
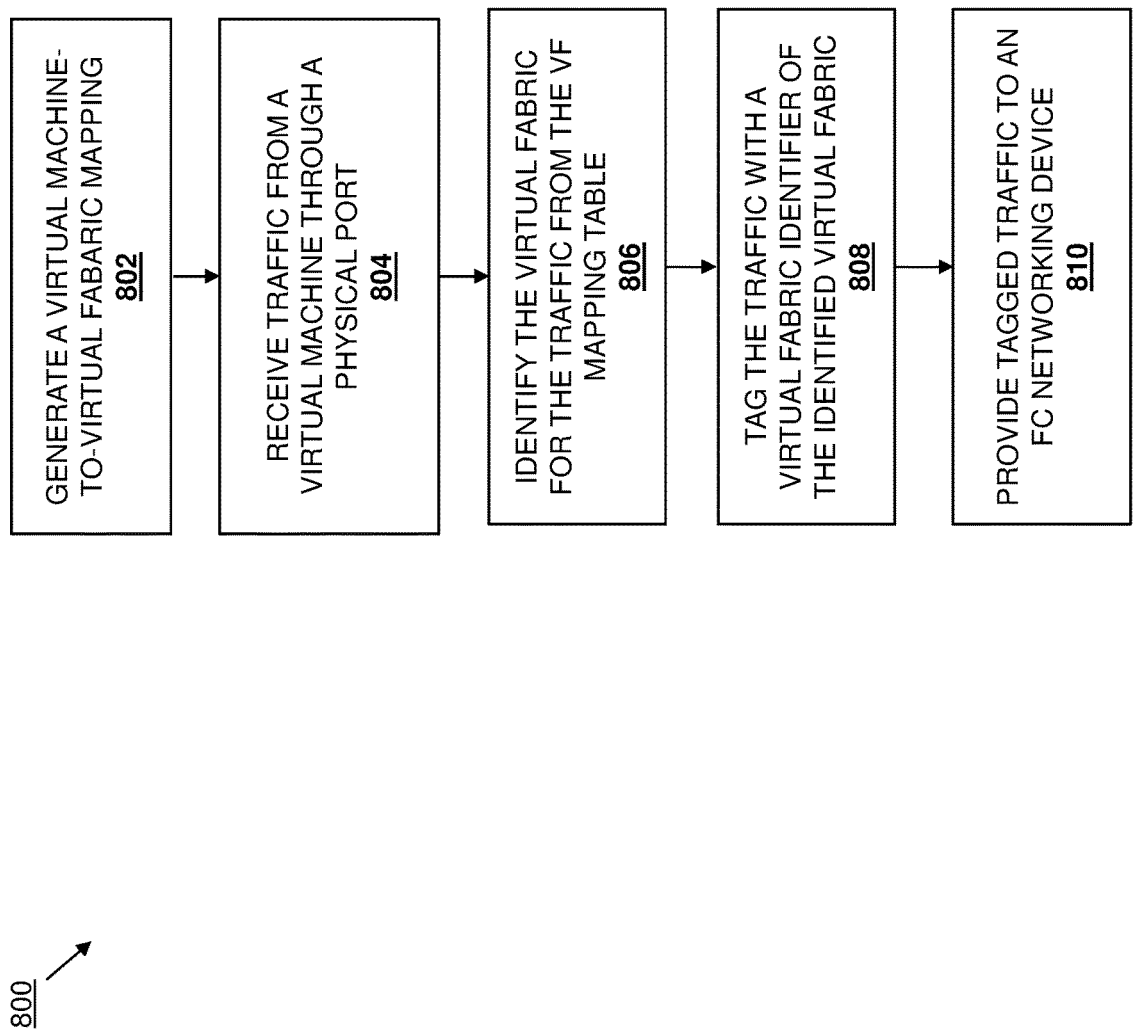
FIG. 8 is a flow chart illustrating an embodiment of a method for handling traffic between virtual machines logged in to separate virtual fabrics.

Referring now to FIG. 8, an embodiment of a method 800 for handling traffic between virtual machines logged in to virtual fabrics is illustrated. As discussed above, during login of a first adapter (e.g., a CNA or a HBA) included in a server device, the first adapter may send a fabric login (FLOGI) to a first virtual fabric, and only that first adapter may log in to that first virtual fabric. Thus, any virtual machine provided on the server device communicating through that first adapter must also log in to the first virtual fabric, as virtual machines configured with a raw device mapping (RDM) will generate fabric discovery messages (FDISCs) on that first adapter. If it is desired that the virtual machine communicates with a second virtual fabric, a second adapter must be present on the server device and must log in to the second virtual fabric, which allows virtual machines provided by the server device to log in to the second fabric through that second adapter. However, this requires additional hardware on the server device and, in some instances, the server device may not be able to support the number of adapters needed to match the number of virtual fabrics accessible through an FC switch. Furthermore, with the availability of high performance CNAs/HBAs, the above problem can lead to under-utilization of bandwidth on the first adapter that is otherwise capable of handling the traffic being handled by the second adapter.

The systems and methods of the present disclosure provide an FCF device that includes a NPG between the server device (which provides access to the virtual machines) and the FC networking device (which provides access to the virtual fabrics). The FCF device and the FC networking device may use a standard Exchange Virtual Fabrics Protocol (EVFP) to exchange virtual fabric identifiers that identify a default virtual fabric, and the FCF device may log in to the FC networking device through the default virtual fabric. When the FCF device detects that the server device supports a virtual machine, a FLOGI (for the physical adapter of the FCF device) may be proxied on the default virtual fabric as an FDISC including a physical device indicator. The physical device indicator included in the FDISC indicates to the FC networking device that that physical adapter in the server device is logging in to the FC networking device rather than a virtual machine. After name server detail registration of the physical adapter included in the FC networking device is performed, name server details will be synced across all tagging-enabled virtual fabrics, and zones of the individual virtual fabrics are replicated on the default virtual fabric to which the physical adapter included in the server device is logged in. At the FCF device, FDISCs from virtual machines logging in through the physical adapter are proxied through the default virtual fabric, and include a virtual machine indicator that indicates to the FC networking device that the FDISCs are associated with virtual machines. The default virtual fabric checks a zone-to-virtual-fabric mapping to identify the virtual fabric to which the virtual machine needs to login, and forwards the FDISC to the virtual fabric that is identified. An FDISC accept message (ACC), which includes the FCID/WWN of the virtual machine, is returned to the default virtual fabric, and the default virtual fabric tags the FDISC ACC with a virtual fabric identifier (VF_ID) for the virtual fabric and provides the tagged FDISC ACC to the FCF device. Upon receiving the tagged FDISC ACC, the FCF device maps the FCID/WWN to that particular VF_ID, and subsequent frames from that FCID will get tagged with the VF_ID. The FC networking device may then use the VF_ID tagged to the traffic to identify the appropriate virtual fabric and provide the traffic to that virtual fabric. As such, virtual machines on a server device may log in to different virtual fabrics through the same physical adapter, which decreases the number of adapters that the server device must support, decreases connections to multiple virtual fabrics, and efficiently utilizes the bandwidth of the adapters on the server device.

The method 800 begins at block 802 where a virtual-machine-to-virtual-fabric mapping is generated. In an embodiment of block 802 and with reference to a virtual fabric login system communication diagram 900 illustrated in FIG. 9, an example of the FCF device database 500 illustrated in FIG. 10A, and the example of the FC networking device database 700 illustrated in FIG. 10B, the FCF device 204 may generate a virtual-machine-to-virtual-fabric mapping using the virtual-machine-to-virtual-fabric mapping table entries 502a-502d in the virtual-machine-to-virtual-fabric mapping table 502 that map virtual machine identifiers for the virtual machines 306a-306c to respective virtual fabric identifiers for the virtual fabrics 605b-605d. As discussed below, the virtual-machine-to-virtual-fabric mappings are used by the FCF device 204 to tag traffic, originating from a virtual machine, with a virtual fabric identifier for a virtual fabric to which the virtual machine is logged in, which allows the FC networking device that receives the tagged traffic to transmit the traffic based on the virtual fabric identifier included in the tag.

Prior to the FCF device 204 logging in to the FC networking device 206 and during a fabric configuration process, the FC networking device 206 and the FCF device 204 may exchange virtual fabric features that are supported by each of the FCF device 204 and the FC networking device 206. For example, the FCF device 204 and the FC networking device 206 may communicate with each other via the exchange virtual fabric parameters (EVFP) protocol in order to exchange supported virtual fabric features such as, for example, the virtual fabric identifiers and virtual fabric tagging discussed below. For example, the FCF device 204 may receive the virtual fabric identifiers VF_ID1, VF_ID2, VF_ID3, and VF_ID4 for the virtual fabrics 605a-605d during the EVFP protocol exchange. Referring to the example of the FC networking device database 700 illustrated in FIG. 10B, the virtual-fabric-identifier-to-virtual-fabric mapping table entry 702a includes the virtual fabric identifier "VF_ID1" identifying the default virtual fabric 605a. The virtual-fabric-identifier-to-virtual-fabric mapping table entry 702b includes the virtual fabric identifier "VF_ID2" identifying the virtual fabric 605b. The virtual-fabric-identifier-to-virtual-fabric mapping table entry 702c includes the virtual fabric identifier "VF_ID3" identifying the virtual fabric 605c. The virtual-fabric-identifier-to-virtual-fabric table entry 702d includes the virtual fabric identifier "VF_ID4" identifying the virtual fabric 605d. In an embodiment, at block 802, the virtual-fabric-identifier-to-virtual-fabric mapping table entries 702a-702d may be exchanged with the FCF device 204.

The FCF device 204 may then log in to the default virtual fabric 605a by, for example, providing a fabric login (FLOGI) and receiving a FLOGI ACC message. After the FLOGI ACC message a default FCF Media Address Control (MAC) address is created. After the FCF device 204 has logged in to the default virtual fabric 605a, the FCF device 204 may receive a fabric login (FLOGI) from the physical server port 310a. For example, and with reference to the virtual fabric login system communication diagram 900 of FIG. 9 and the virtual fabric login system 200 of FIG. 2, at step 902 the FCF device 204 may receive a FLOGI from the server device 202. The FCF device 204 may recognize that the FLOGI is from a physical adapter and that the server device 202 includes the virtual machine engine 306. At step 904, upon determining that: the FLOGI is from the physical server port 310a, the server device 202 includes the virtual machine engine 306, and FLOGI is directed to the FC networking device 206 identified by the default FCF MAC, the FCF device 204 may proxy the FLOGI as a Fabric Discovery message (FDISC) that includes a physical adapter indicator that indicates to the FC networking device 206 that the FDISC is for a physical adapter. For example, the physical adapter indicator may include a virtual fabric bit set in the FDISC to indicate to the FC networking device 206 that the FDISC is for logging in the physical server port 310a on the server device 202, and the FDISC will be provided on the default virtual fabric 605a to the FC networking device 206.

In response to receiving the FDISC including the physical adapter indicator, the FC networking device 206 may recognize that the FDISC is from the physical server port 310a of the server device 202, and the FC networking device 206 may perform name server registration of name server details for the physical adapter of the server device 202 using the default virtual fabric 605a. For example, the FC networking device 206 may sync the name server details to the virtual fabrics 605b-605d that are tagging-enabled and that are mapped to the default virtual fabric 605a. Referring to the example of the FC networking device database 700 illustrated in FIG. 10B, the device-login-to-virtual-fabric-identifier table entry 714a identifies that the FDISC1 (logged in through the default virtual fabric 605a based on the FLOGI from the FCF device 204a) is mapped to the virtual fabric identifier "VF_ID1" identifying the default virtual fabric 605a, the virtual fabric identifier "VF_ID2" identifying the virtual fabric 605b, the virtual fabric identifier "VF_ID3" identifying the virtual fabric 605c, and the virtual fabric identifier "VF_ID4" identifying the virtual fabric 605d. Furthermore, name server details for the physical adapter in the server device 202 may be synced on all virtual fabrics 605a-605d identified in the virtual fabric identifier column 718.

Additionally, the zones for each of the virtual fabrics 605b-605d may be replicated on the default virtual fabric 605a. In an embodiment, the zones for each of the virtual fabrics 605b-605d may be specially tagged in the default virtual fabric 605a to indicate which of the virtual fabrics 605b-605d belong to each zone. For example, referring to the example of the zone-to-virtual-fabric table 708 illustrated in FIG. 10B, the zone zone-to-virtual-fabric table entry 708a includes "ZONEA" identifying the virtual fabric 605b, the zone-to-virtual-fabric table entry 708b includes "ZONEB" identifying the virtual fabric 605c, and the zone-to-virtual-fabric table entry 708c includes "ZONEC" identifying the virtual fabric 605d. While not illustrated, "ZONEA" may also identify the virtual machine 306a, "ZONEB" may also identify the virtual machine 306b, and "ZONEC" may also identify the virtual machine 306c.

Figure 9:
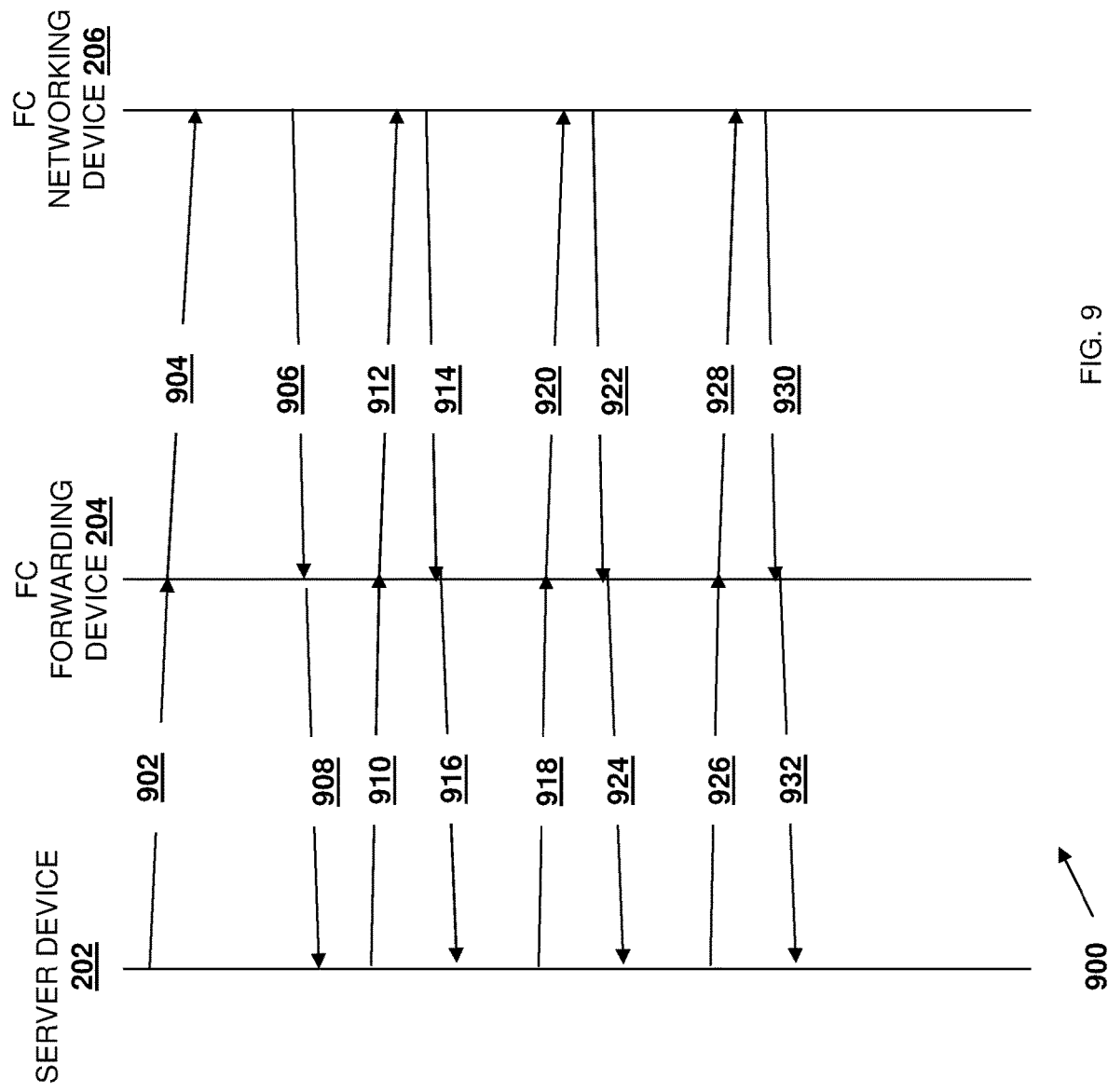
FIG. 9 is a communication diagram illustrating an embodiment of FCF devices and FC networking devices in the virtual fabric login system of FIG. 2 logging in virtual machines to virtual fabrics during the method of FIG. 8.
Figure 10A:
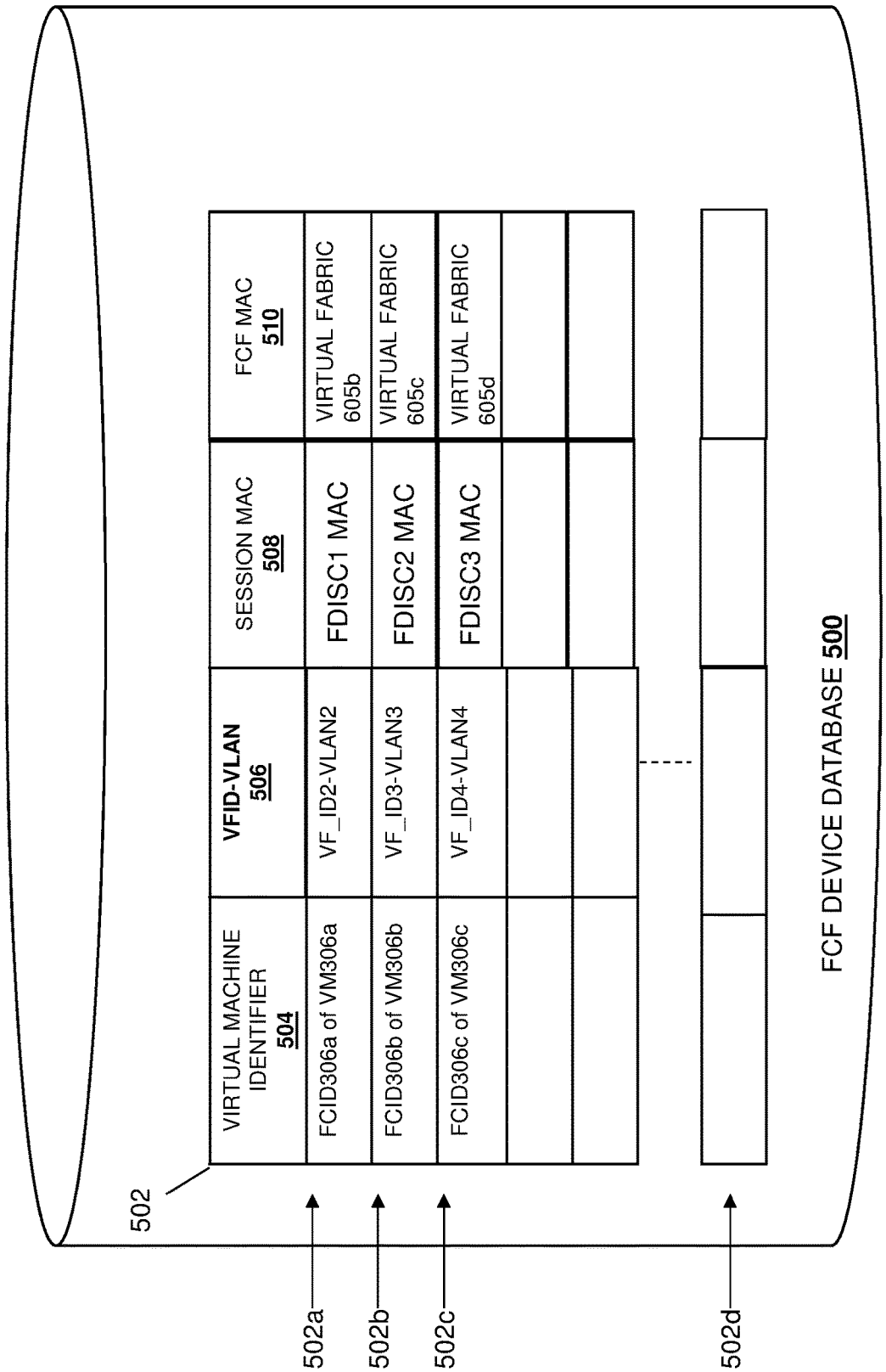
FIG. 10A is a schematic view illustrating an embodiment of information being provided in the FCF device database of FIG. 5 during the method of FIG. 8.
Figure 10B:
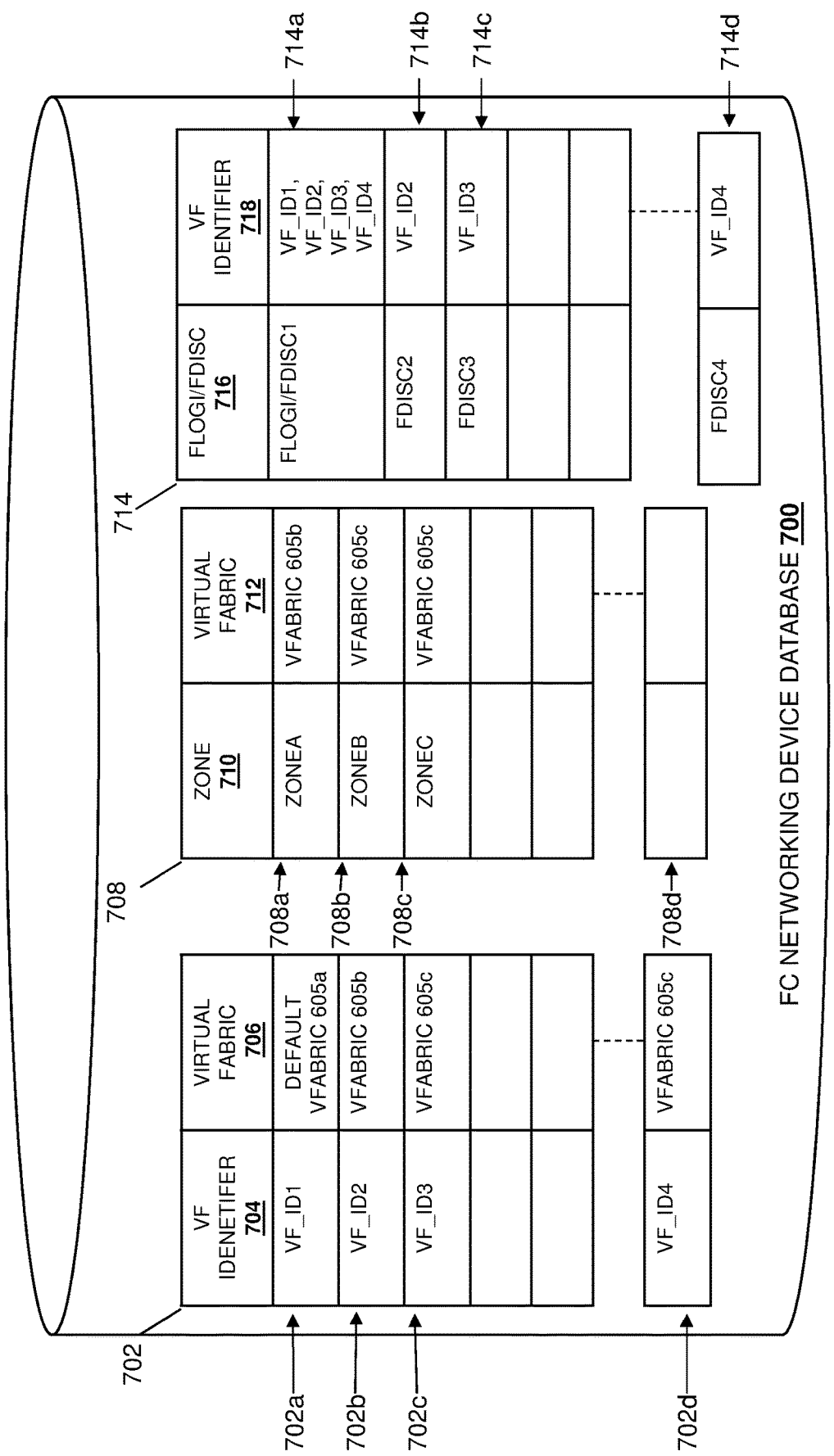
FIG. 10B is a schematic view illustrating an embodiment of information being provided in the FC networking device database of FIG. 7 during the method of FIG. 8.

The virtual fabric login system communication diagram 900 illustrated in FIG. 9 then continues with step 906 where the FC networking device 206 provides an FDISC accept message (ACC) on the default virtual fabric 605a. In some embodiments, the FDISC ACC may include the Fibre Channel Identifier (FCID) assigned to the physical server port 310a. In other embodiments, a Port World Wide Name (PWWN), a Fabric Provided MAC address (FPMA), and/or any other physical port or physical server device identifier that would be apparent to one of skill in the art in possession of the present disclosure may be provided to the physical server port 310a of the server device 202. The FCF device 204 may then generate a physical-machine-to-virtual-fabric mapping that maps the physical port identifier to a default virtual fabric identifier and the default FCF MAC. At step 908, the FCF device 204 provides a FLOGI ACC to the physical server port 310a on the server device 202 to complete the fabric login for the physical server port 310a to the default virtual fabric 605a that is accessed through the FC networking device 206.

At step 910, the virtual machine 306a that includes a first virtual node port (VN_Port) may provide a FDISC to the FCF device 204. The FCF device 204 will recognize that the DISC originated from a virtual machine and, at step 912, provide an FDISC including a virtual machine indicator (e.g., an unset virtual fabric bit in the FDISC) through the default virtual fabric 605a to the FC networking device 206. In an embodiment, the default virtual fabric 605a that is accessed via the FC networking device 206 may check the zone-to-virtual-fabric table 708 to identify the virtual fabric to which the virtual machine 306a is permitted to log in. As such, based on the virtual machine 306a belonging to zone "ZONEA" that is provided by the virtual fabric 605b in this example, the default virtual fabric 605a may tag the FDISC "FDISC2" with the "VF_ID2" identifying the virtual fabric 605b, as illustrated in the device-login-to-virtual-fabric-identifier table entry 714b illustrated in FIG. 10B. The FDISC may then be routed through the corresponding virtual fabric 605b to perform the log in process.

At step 914, a tagged FDISC ACC is provided by the FC networking device 206 to the FCF device 204 via the virtual fabric 605b. In an embodiment, the tagged FDISC ACC may be provided on a link that was established between the FC networking device 206 and the FCF device 204 when the FCF device 204 logged in to the FC networking device 206. In some examples, the FDISC ACC may include the virtual machine identifier (e.g., an FCID assigned to the VN_Port of the virtual machine 306a by the virtual fabric 605b, a PWWN, an FPMA, and/or any other virtual machine identifier that would be apparent to one of skill in the art in possession of the present disclosure). Referring to the virtual-machine-to-virtual-fabric mapping table entry 502a illustrated in FIG. 10A, the FCF device 204 may generate a to the FCF device 204 mapping that maps the virtual machine identifier "FCID306a" identifying the virtual machine 306a to a virtual fabric identifier "VF_ID2" identifying the virtual fabric 605b tagged in the FDISC ACC. At step 916, the FCF device 204 may provide a FDISC ACC to the server device 202 to complete the FDISC of the VN_port to the virtual fabric 605b.

At step 918, the virtual machine 306b including a second virtual node port may provide a FDISC to the FCF device 204. The FCF device 204 will recognize that the FDISC originated from a virtual machine and, at step 920, provide an FDISC with a virtual machine indicator (e.g., an unset virtual fabric bit in the FDISC) through the default virtual fabric 605a to the FC networking device 206. The default virtual fabric 605a that is accessed via the FC networking device 206 will check the zone-to-virtual fabric-table 708 illustrated in FIG. 10B to identify the virtual fabric to which the virtual machine 306b is permitted to log in. As such, based on the virtual machine 306b belonging to zone "ZONEB" that is provided by the virtual fabric 605c in this example, the default virtual fabric 605a may tag the FDISC "FDISC3" with the "VF_ID3" identifying the virtual fabric 605c, as illustrated in the device-login-to-virtual-fabric-identifier table entry 714c. The FDISC is then routed through the corresponding virtual fabric 605c to perform the log in process.

At step 922, a tagged FDISC ACC is provided by the FC networking device 206 to the FCF device 204 via the virtual fabric 605c. The tagged FDISC ACC may be provided on the link that was established between the FC networking device 206 and the FCF device 204 when the FCF device 204 logged in to the FC networking device 206. In an embodiment, the tagged FDISC ACC may include the virtual machine identifier (e.g., an FC_ID assigned to the VN_Port of the virtual machine 306b by the virtual fabric 605c, a PWWN, an FPMA, and/or any other virtual machine identifier that would be apparent to one of skill in the art in possession of the present disclosure). Referring to the virtual-machine-to-virtual-fabric mapping table entry 502b illustrated in FIG. 10A, the FCF device 204 may generate a to the FCF device 204 mapping that maps the virtual machine identifier "FCID306b" identifying the virtual machine 306b to a virtual fabric identifier "VF_ID3" identifying the virtual fabric 605c that was tagged in the FDISC ACC. At step 924, the FCF device 204 provides a FDISC ACC to the server device 202 to complete the FDISC of the second virtual node port to the virtual fabric 605c.

At step 926, the virtual machine 306c including a third virtual node port may provide a FDISC to the FCF device 204. The FCF device 204 will recognize that the FDISC originated from a virtual machine and, at step 928, provide an FDISC including a virtual machine indicator (e.g., an unset virtual fabric bit in the FDISC) through the default virtual fabric 605a to the FC networking device 206. The default virtual fabric 605a that is accessed via the FC networking device 206 will check the zone-to-virtual-fabric table 708 to identify the virtual fabric to which the virtual machine 306c is permitted to log in. As such, based on the virtual machine 306c belonging to zone "ZONEC" that is provided by the virtual fabric 605d in this example, the default virtual fabric 605a may tag the FDISC "FDISC4" with the "VF_ID4" identifying the virtual fabric 605d, as illustrated in the device-login-to-virtual-fabric table entry 714d. The FDISC is then routed through the corresponding virtual fabric 605d to perform the log in process.

At step 930, a tagged FDISC ACC is provided by the FC networking device 206 to the FCF device 204 via the virtual fabric 605c. In an embodiment, the tagged FDISC ACC may be provided on the link that was established between the FC networking device 206 and the FCF device 204 when the FCF device 204 logged in to the FC networking device 206. For example, the FDISC ACC may include the virtual machine identifier (e.g., an FC_ID assigned to the third virtual node port of the virtual machine 306c by the virtual fabric 605d, a PWWN, an FPMA, and/or any other virtual machine identifier that would be apparent to one of skill in the art in possession of the present disclosure). Referring to the virtual-machine-to-virtual-fabric mapping table entry 502c illustrated in FIG. 10A, the FCF device 204 may generate a virtual-machine-to-virtual-fabric mapping that maps the virtual machine identifier "FCID306c" identifying the virtual machine 306c to a virtual fabric identifier "VF_ID4" identifying the virtual fabric 605d tagged in the FDISC ACC. Also, the virtual fabric identifier "VF_ID4" may be mapped to a VLAN "VLAN4." At step 932, the FCF device 204 may provide a FDISC ACC to the server device 202 to complete the FDISC of the third virtual node port of the virtual machine 306c to the virtual fabric 605d.

In an embodiment, the FCF device 204 may map the virtual fabric identifiers to the FCF Media Address Control (MAC) addresses that were created for those virtual fabrics. For example, an FCF MAC in the FCF MAC column 510 may be mapped to the virtual fabric identifier identified in the virtual fabric identifier column 506. Referring to the example of the virtual-machine-to-virtual-fabric mapping table 502 illustrated in FIG. 10A, "VF_ID2" identifying the virtual fabric 605b in the virtual-machine-to-virtual-fabric mapping table entry 502a is mapped to "VIRTUAL FABRIC 605b", "VF_ID3" identifying the virtual fabric 605c in the virtual-machine-to-virtual-fabric mapping table entry 502b is mapped to "VIRTUAL FABRIC 605c", and "VF_ID4" identifying the virtual fabric 605d in the virtual-machine-to-virtual-fabric mapping table entry 502c is mapped to "VIRTUAL FABRIC 605d". While not illustrated, the "VF_ID1" identifying the default virtual fabric (e.g., as illustrated in the virtual-fabric-identifier-to-virtual-fabric mapping table entry 702a illustrated in FIG. 10B) may be mapped to the FCF MAC "DEFAULT VIRTUAL FABRIC 605a" as well.

In an embodiment, the FCF device 204 may map the virtual machine identifiers to the session MAC addresses that were created for each login of the virtual machine 306a-306c to its respective virtual fabric 605b-605d. For example, a session MAC in the session MAC column 508 may be mapped to the virtual fabric identifier identified in the virtual fabric identifier column 506. Referring to the example of the virtual-machine-to-virtual-fabric mapping table 502 illustrated in FIG. 10A, "FCID306a" identifying the virtual machine 306a in the virtual-machine-to-virtual-fabric mapping table entry 502a is mapped to "FDISC1 MAC", "FCID306b" identifying the virtual machine 306b in the virtual-machine-to-virtual-fabric mapping table entry 502b is mapped to "FDISC2 MAC", and "FCID306c" identifying the virtual machine 306c in the virtual-machine-to-virtual-fabric mapping table entry 502c is mapped to "FDISC3 MAC". While not illustrated, the physical machine identifier identifying the physical adapter may be mapped to a session MAC as well. Furthermore, and referring to the example of the FC networking device database 700 illustrated in FIG. 10B, the device-login-to-virtual-fabric-identifier table entry 714a identifies that the FLOGI from the FCF device 204a is mapped to the virtual fabric identifier "VF_ID1" identifying the default virtual fabric 605a, the virtual fabric identifier "VF_ID2" identifying the virtual fabric 605b, the virtual fabric identifier "VF_ID3" identifying the virtual fabric 605c, and the virtual fabric identifier "VF_ID4" identifying the virtual fabric 605d. While the virtual fabric login system communication diagram 900 illustrates three virtual machines 306a-306c logging in to three virtual fabrics 605b-605d, one of skill in the art in possession of the present disclosure will recognize that any number of virtual machines may log in to any number of virtual fabrics, more than one virtual machine may log in to a virtual fabric, different virtual node ports included in a virtual machine may log in to separate virtual fabrics, and/or log ins may be provided for any other topology combination of virtual machines, virtual node ports included in those virtual machines, and virtual fabrics according to the teachings of the present disclosure.

Figure 11A:
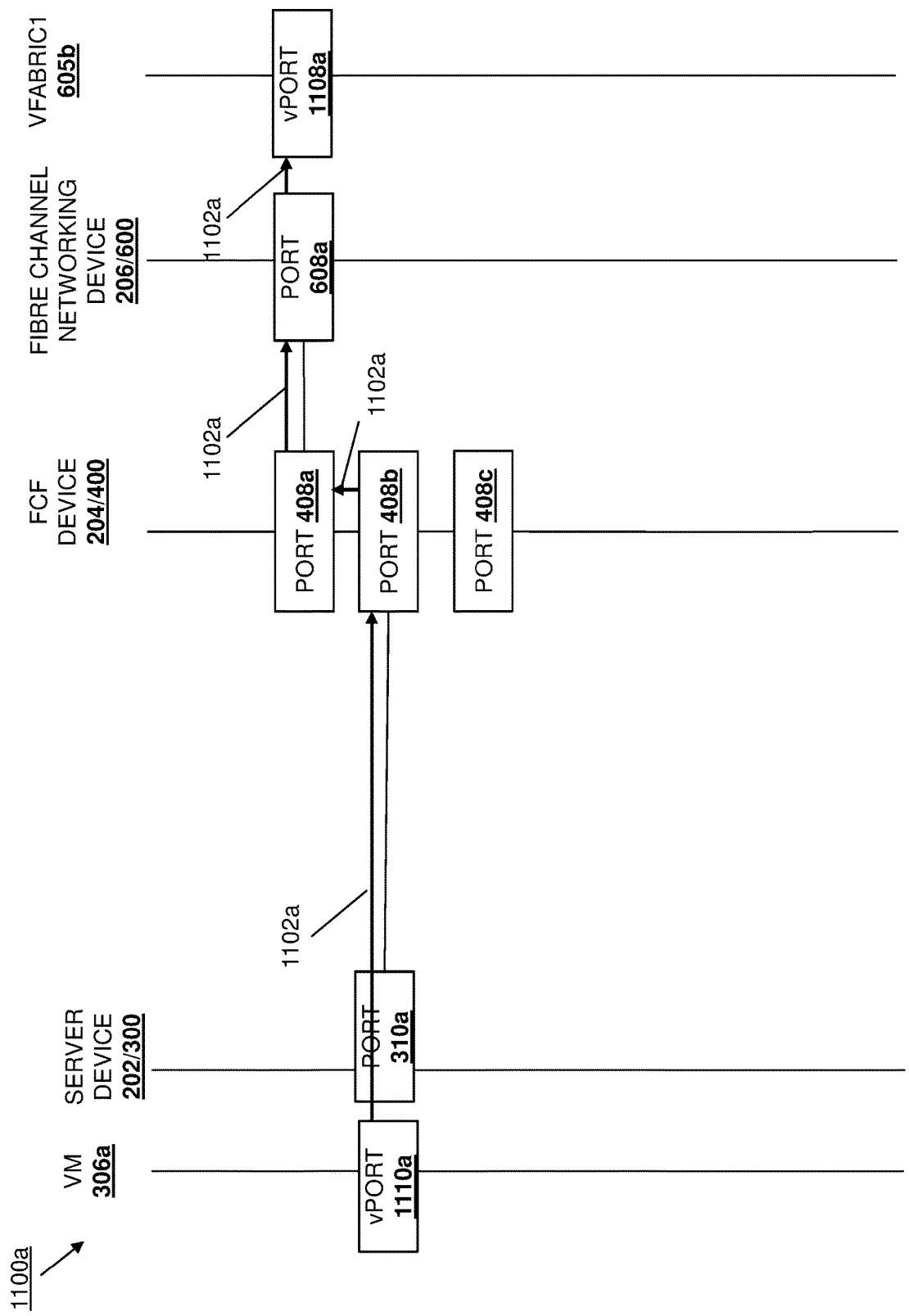
FIG. 11A is a diagram illustrating an embodiment of traffic handling for virtual machines logged in to segregated virtual fabrics during the method of FIG. 8.
Figure 11B:
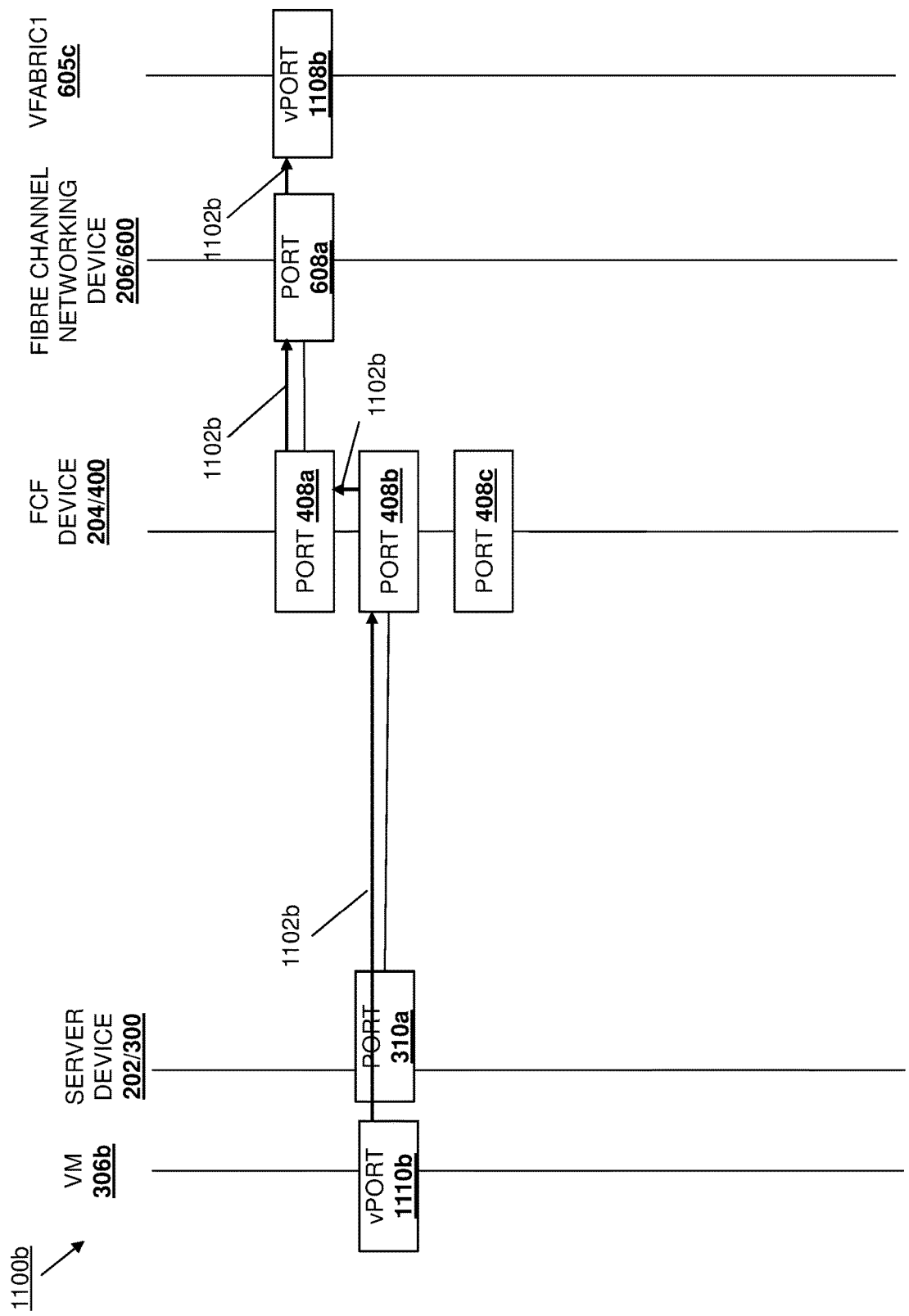
FIG. 11B is a diagram illustrating an embodiment of traffic handling for virtual machines logged in to segregated virtual fabrics during the method of FIG. 8.
Figure 11C:
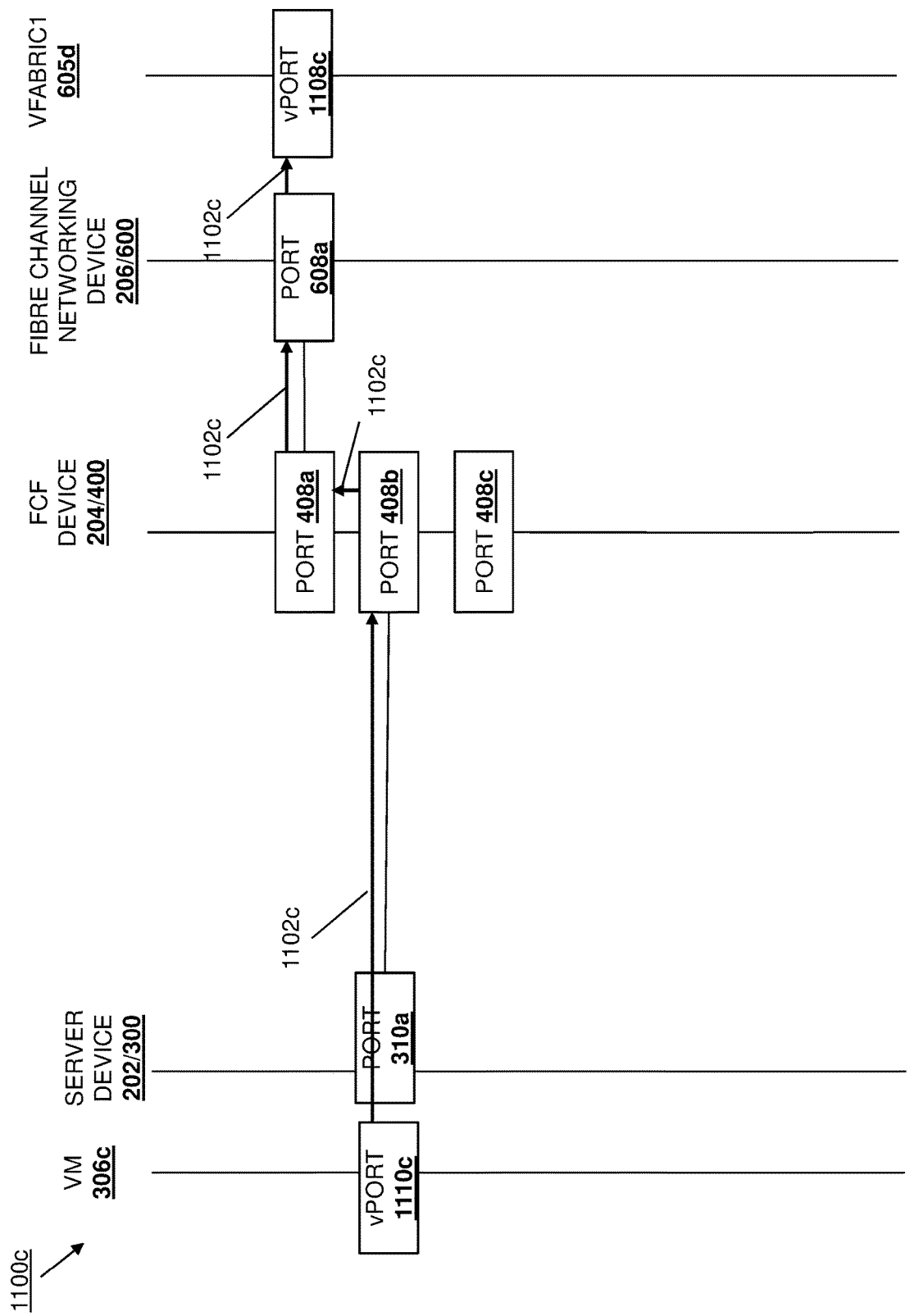
FIG. 11C is a diagram illustrating an embodiment of traffic handling for virtual machines logged in to segregated virtual fabrics during the method of FIG. 8.

The method 800 may then proceed to block 804 where traffic is received at the FCF device from a virtual machine via the physical server port and a first FCF device port. In an embodiment of block 804, one of the virtual machines 306a-306c may provide traffic to the FCF device 204 that is destined for one of the virtual fabrics 605b-605d, or that must be routed through one of the virtual fabric 605b-605d. The traffic may include a default FCF MAC as the destination MAC such that the traffic is provided to the FCF device 204. For example, and with reference to the traffic handling diagram 1100a illustrated in FIG. 11A, the virtual machine 306a may provide traffic to the FCF device 204. As illustrated by the traffic route 1102a, the traffic may be destined for the virtual fabric 605b, and provided to the FCF device 204 from a virtual node port 1110a and through the physical server port 310a to an FCF device port 408b. With reference to the example provided by the traffic handling diagram 1100b illustrated in FIG. 11B, the virtual machine 306b may provide traffic to the FCF device 204. As illustrated by the traffic route 1102b, the traffic may be destined for the virtual fabric 605c, and provided to the FCF device 204 from a virtual node port 1110b and through the physical server port 310a to an FCF device port 408b. Referring to the example provided by the traffic handling diagram 1100c illustrated in FIG. 11C, the virtual machine 306c may provide traffic to the FCF device 204. As illustrated by the traffic route 1102c, the traffic may be destined for the virtual fabric 605d, and provided to the FCF device 204 from a virtual node port 1110c and through the physical server port 310a to an FCF device port 408b.

The method 800 may then proceed to block 806 where it is determined, using the virtual machine identifier and a virtual-machine-to-virtual-fabric mapping, that the virtual machine identifier is associated with a virtual fabric identifier that identifies a virtual fabric. In an embodiment of block 806, the FCF device 204 may retrieve the virtual machine identifier that is included in the traffic received from one of the virtual machines 306a-306c and that identifies that virtual machine with respect to the virtual-machine-to-virtual-fabric mappings (e.g., the virtual-machine-to-virtual-fabric mapping table entries 502a-502c in the virtual-machine-to-virtual-fabric mapping table 502). For example, and with reference to the traffic handling diagram 1100a illustrated in FIG. 11A and the virtual-machine-to-virtual-fabric mapping table entry 502a illustrated in FIG. 10A, the FCF device 204 will determine that the traffic includes "FCID306a" that identifies the virtual machine 306a and is mapped to virtual fabric identifier "VF_ID2" and has a destination MAC of "VIRTUAL FABRIC 605b". Referring to the example provided by the traffic handling diagram 1100b illustrated in FIG. 11B and the virtual-machine-to-virtual-fabric mapping table entry 502b illustrated in FIG. 10A, the FCF device 204 will determine that the traffic includes "FCID306b" that identifies the virtual machine 306b and is mapped to virtual fabric identifier "VF_ID3" and has a destination MAC of "VIRTUAL FABRIC 605c". Referring to the example provided by the traffic handling diagram 1100c illustrated in FIG. 11C and the virtual-machine-to-virtual-fabric mapping table entry 502c illustrated in FIG. 10A, the FCF device 204 will determine that the traffic includes "FCID306c" that identifies the virtual machine 306c and that is mapped to virtual fabric identifier "VF_ID4" and has a destination MAC of "VIRTUAL FABRIC 605d".

The method 800 may then proceed to block 808 where the first traffic is tagged with the first virtual fabric identifier to provide tagged first traffic. In an embodiment of block 808, the FCF device 204 may tag the traffic received from the virtual machines 306a, 306b, and/or 306c with the corresponding virtual fabric identifier that identifies the virtual fabrics 605b-605d before that traffic is egressed out the physical node (PN) port on the FCF device 204 that is coupled to the Fabric (F) port on the FC networking device 206. Continuing with the examples in the traffic handling diagrams 1100a-1100c illustrated in respective FIGS. 11A-11C and the virtual-machine-to-virtual-fabric mapping table entries 502a-502c, the FCF device 204 tags the traffic in traffic route 1102a with the virtual fabric identifier VF_ID2 and replaces the destination MAC with the FCF MAC "VIRTUAL FABRIC 306b", tags the traffic in traffic route 1102b with the virtual fabric identifier VF_ID3 and replaces the destination MAC with the FCF MAC "VIRTUAL FABRIC 306c", and tags the traffic in traffic route 1102c with the virtual fabric identifier VF_ID4 and replaces the destination MAC with the FCF MAC "VIRTUAL FABRIC 306d".

The method 800 then proceeds to block 810 where the tagged traffic is transmitted via the FC networking device port and the second FCF device port to the FC networking device. In an embodiment of block 810, the FCF device 204 transmits the traffic tagged with the virtual fabric identifier to the FC networking device 206 via the PN port on the FCF device 204 that is coupled to the F port on the FC networking device 206. In an embodiment, the tagged traffic may be provided on the VLAN identified by the VFID-VLAN column 506 in the virtual-machine-to-virtual-fabric mapping table by replacing a default FCoE VLAN in the traffic through which the traffic traversed to the FCF device 204 with the VLAN identified in the VFID-VLAN column 506. Because the VLAN to VF_ID mapping is done on a PHY, the VF_ID tag may be added based on the VLAN while egressing out on the NP port. Continuing with the examples in the traffic handling diagrams 1100a-1100c illustrated in respective FIGS. 11A-11C, the tagged traffic in each traffic route 1102a-1102c is provided between FCF device port 408a and FC networking device port 608a.

When the tagged traffic is received at the FC networking device 206, the switching logic provided by the FC networking device engine 604 may process the tagged traffic. In an embodiment, the FC networking device engine 604 may access the virtual-fabric-identifier-to-virtual-fabric mapping table 702 and the virtual fabric identifier tagged in the traffic, and determine the virtual fabric identified by the virtual fabric identifier. The FC networking device engine 604 included in the FC networking device 206 may then provide the tagged traffic to the corresponding virtual fabric identified by the virtual fabric identifier in the tagged traffic. Continuing with the examples in the traffic handling diagrams 1100a-1100c illustrated in respective FIGS. 11A-11C and the virtual-fabric-identifier-to-virtual-fabric mapping table entries 702a-702d of FIG. 10B, the FC networking device engine 604 included in the FC networking device 206 may determine that the VF_ID2 tagged to the traffic provided on the traffic route 1102a illustrated in FIG. 11A corresponds with the virtual fabric 605b, and provide the traffic to the virtual fabric port 1108a. Similarly, the FC networking device engine 604 included in the FC networking device 206 may determine that the VF_ID3 tagged to the traffic provided on the traffic route 1102b illustrated in FIG. 11B corresponds with the virtual fabric 605c, and provide the traffic to the virtual fabric port 1108b. Similarly, the FC networking device engine 604 included in the FC networking device 206 may determine that the VF_ID4 tagged to the traffic provided on the traffic route 1102c illustrated in FIG. 11C corresponds with the virtual fabric 605d, and provide the traffic to the virtual fabric port 1108c.

In various embodiments, downstream traffic from a virtual fabric 605b-605d to any of the virtual machines 306a-306c may include the virtual fabric identifier, and the FC networking device 206 may use the virtual fabric identifier and the FCID in the downstream traffic to provide the downstream traffic to the FCF device 204. The FCF device 204 may then identify the FCID in the downstream traffic. The FCF device 204 removes the virtual fabric identifier tag, converts the downstream traffic to a FCoE frame by adding the source MAC as the default FCF MAC and the VLAN as the default FCoE VLAN, and forwards the downstream traffic to the virtual machine identified in the downstream traffic based on the session MAC entry in the virtual-machine-to-virtual-fabric mapping table.

Thus, system and methods have been described that provide for logging virtual machines in to virtual fabrics, as well as handling traffic between the virtual machines and the virtual fabric to which those virtual machines are logged in. The virtual fabric login described herein is configured to allow distinct virtual machines provided by a server device to log in to separate virtual fabrics through the same physical port provided on the server device. For example, an FCF device and an FC device that provide access to the virtual fabrics may facilitate separate logins to each virtual fabric, with the FCF device generating virtual-machine-to-virtual-fabric mappings that identify the virtual fabric to which each virtual machine is logged in. Subsequent traffic received at the FCF device from the virtual machine may then be tagged with a virtual fabric identifier based on the virtual machine identifier included in the traffic and the virtual-machine-to-virtual-fabric mappings. The FCF device then transmits the tagged traffic to the FC networking device, and a switching logic in the FC networking device processes the tag to determine to which virtual fabric to provide the traffic based on the virtual fabric identifier, and provides that traffic to that virtual fabric. As such, a single physical adapter on a server device can provide virtual machines access to more than one virtual fabric, utilizing the bandwidth of the physical adapter more efficiently, and eliminating the need for respective physical adapters for each virtual fabric logged in to by the virtual machines provided by the server device as in required in conventional systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtual fabric login system, comprising:
a Fibre Channel (FC) networking device that is configured to provide access to a plurality of virtual fabrics:
a server device that includes a hypervisor that is configured to provide a plurality of virtual machines; and
a Fibre Channel Forwarder (FCF) device that is coupled to a physical server device port included on the server device via a first FCF device port, and coupled to an FC networking device port included on the FC networking device through a second FCF device port, wherein the FCF device is configured to:
receive, via the physical server device port and the first FCF device port, first traffic from a first virtual machine that is included in the plurality of virtual machines, wherein the first traffic includes a first virtual machine identifier that identifies the first virtual machine;
determine, using the first virtual machine identifier and a virtual-machine-to-virtual-fabric mapping, that the first virtual machine identifier is associated with a first virtual fabric identifier that identifies a first virtual fabric included in the plurality of virtual fabrics;
tag the first traffic with the first virtual fabric identifier to provide tagged first traffic; and
transmit, via the FC networking device port and the second FCF device port, the tagged first traffic to the FC networking device.

2. The system of claim 1, wherein the FC networking device is configured to:
determine, using first virtual fabric identifier included in the tagged first traffic, that the first virtual fabric identifier identifies the first virtual fabric; and
provide the first traffic to the first virtual fabric.

3. The system of claim 1, wherein the providing the tagged first traffic to the FC networking device via the FC networking device port and the second FCF device port is performed using a default virtual fabric that is included in the plurality of virtual fabrics and to which the FCF device is logged in.

4. They system of claim 1, wherein the FCF device is configured to:
   receive, from the FC networking device via the second FCF device port, second traffic originating from the first virtual fabric;
   determine that the second traffic includes the first virtual machine identifier; and
   provide the second traffic to the first virtual machine.

5. The system of claim 1, wherein the FCF device is configured to:
   receive a first fabric discovery (FDISC) message from the server device;
   determine that the first FDISC message is a FDISC from the first virtual machine and, in response, transmit a second FDISC message with a virtual fabric bit unset to a default virtual fabric included in the plurality of virtual fabrics;
   receive a first FDISC accept message (ACC) from the first virtual fabric through the default virtual fabric, wherein the FDISC accept message is tagged with the first virtual fabric identifier; and
   generate the virtual-machine-to-virtual-fabric mapping that includes the first virtual machine identifier that identifies the first virtual machine and that is associated with the first virtual fabric identifier.

6. The system of claim 5, wherein the FCF device is configured to:
   log in the physical server device port included on the server device to the default virtual fabric prior to the receiving the first FDISC by:
      receiving a first FLOGI from the server device;
      determining that the first FLOGI is a FLOGI from the physical server device port and, in response, transmitting a third FDISC message with the virtual fabric bit set to the default virtual fabric;
      receiving a second FDISC ACC from the default virtual fabric; and
      providing a first FLOGI ACC to the server device that indicates that the physical server device port is logged in to the default virtual fabric.

7. The system of claim 6, wherein the FCF device is configured to:
   log in to the default virtual fabric prior to logging in the physical server device port included on the server device to the default virtual fabric by:
      receiving a plurality of virtual fabric identifiers that each identify a virtual fabric included in the plurality of virtual fabrics;
      transmitting a second fabric login (FLOGI) through the default virtual fabric to the FC networking device; and
      receiving a second FLOGI ACC indicating that the FCF device is logged in to the default virtual fabric.

8. The system of claim 7, wherein the receiving the plurality of virtual fabric identifiers that each identify a virtual fabric included in the plurality of virtual fabrics is performed using an Exchange Virtual Fabrics Protocol (EVFP).

9. The system of claim 1, wherein the FCF device is configured to:
   receive, via the physical server device port and the first FCF device port, second traffic from a second virtual machine that is included in the plurality of virtual machines, wherein the second traffic includes a second virtual machine identifier that identifies the second virtual machine;
   determine, using the second virtual machine identifier and the virtual-machine-to-virtual-fabric mapping, that the second virtual machine identifier is associated with a second virtual fabric identifier that identifies a second virtual fabric included in the plurality of virtual fabrics;
   tag the second traffic with the second virtual fabric identifier to provide tagged second traffic; and
   transmit, via the FC networking device port and the second FCF device port, the tagged second traffic to the FC networking device.

10. An Information Handling System (IHS), comprising:
    a plurality of ports;
    a processing system that is coupled to the plurality of ports; and
    a memory system that is coupled to the processing system and that includes instructions that, when executed by the processing system, cause the processing system to provide an N_Port ID Virtualization (NPIV) Proxy Gateway (NPG) engine that is configured to:
       receive, from a physical server device port on a server device that includes a hypervisor that is configured to provide a plurality of virtual machines and via a first port of the plurality of ports, first traffic from a first virtual machine that is included in the plurality of virtual machines, wherein the first traffic includes a first virtual machine identifier that identifies the first virtual machine;
       determine, using the first virtual machine identifier and a virtual-machine-to-virtual-fabric mapping, that the first virtual machine identifier is associated with a first virtual fabric identifier that identifies a first virtual fabric of a plurality of virtual fabrics accessible through a Fibre Channel (FC) networking device;
       tag the first traffic with the first virtual fabric identifier to provide tagged first traffic; and
       transmit, via a second port of the plurality of ports to an FC networking device port of the FC networking device, the tagged first traffic.

11. The IHS of claim 10, wherein the NPG engine is configured to:
    receive, from the physical server device port and via the first port of the plurality of ports, second traffic from a second virtual machine that is included in the plurality of virtual machines, wherein the second traffic includes a second virtual machine identifier that identifies the second virtual machine;
    determine, using the second virtual machine identifier and the virtual-machine-to-virtual-fabric mapping, that the second virtual machine identifier is associated with a second virtual fabric identifier that identifies a second virtual fabric of the plurality of virtual fabrics;
    tag the second traffic with the second virtual fabric identifier to provide tagged second traffic; and
    transmit, via the second port of the plurality of ports to the FC networking device port, the tagged second traffic.

12. The IHS of claim 10, wherein the tagged first traffic is configured to cause the FC networking device to:
    determine, using first virtual fabric identifier included in the tagged first traffic, that the first virtual fabric identifier identifies the first virtual fabric; and
    provide the first traffic to the first virtual fabric.

13. The IHS of claim 10, wherein the providing the tagged first traffic to the FC networking device via the FC networking device port and the second port is performed using a default virtual fabric that is included in the plurality of virtual fabrics and to which the NPG engine is logged in.

14. The IHS of claim 10, wherein the NPG engine is configured to:
   receive a first fabric discovery (FDISC) message from the server device;
   determine that the first FDISC message is a FDISC from the first virtual machine and, in response, transmit a second FDISC message with a virtual fabric bit unset to a default virtual fabric included in the plurality of virtual fabrics;
   receive a first FDISC accept message (ACC) from the first virtual fabric through the default virtual fabric, wherein the FDISC accept message is tagged with the first virtual fabric identifier; and
   generate the virtual-machine-to-virtual-fabric mapping that includes the first virtual machine identifier that identifies the first virtual machine and that is associated with the first virtual fabric identifier.

15. The IHS of claim 14, wherein the NPG engine is configured to:
   log in the physical server device port included on the server device to the default virtual fabric prior to the receiving the first FLOGI by:
   receiving a first FLOGI from the server device;
   determining that the first FLOGI is a FLOGI from the physical server device port and, in response, transmitting a second FDISC message with the virtual fabric bit set to the default virtual fabric;
   receiving a third FDISC ACC from the default virtual fabric; and
   providing a first FLOGI ACC to the server device that indicates that the physical server device port is logged in to the default virtual fabric.

16. The IHS of claim 15, wherein the NPG engine is configured to:
   log in to the default virtual fabric prior to logging in the physical server device port included on the server device to the default virtual fabric by:
   receiving a plurality of virtual fabric identifiers that each identify a virtual fabric included in the plurality of virtual fabrics;
   transmitting a second fabric login (FLOGI) through the default virtual fabric to the FC networking device; and
   receiving a second FLOGI ACC indicating that the NPG engine is logged in to the default virtual fabric.

17. A method of traffic handling between virtual machines and virtual fabrics, comprising:
   receiving, by an Fibre Channel Forwarder (FCF) device via a first FCF device port from a physical server device port on a server device that includes a hypervisor that is configured to provide a plurality of virtual machines, first traffic from a first virtual machine that is included in the plurality of virtual machines, wherein the first traffic includes a first virtual machine identifier that identifies the first virtual machine;
   determining, by the FCF device and using the first virtual machine identifier and a virtual-machine-to-virtual-fabric mapping, that the first virtual machine identifier is associated with a first virtual fabric identifier that identifies a first virtual fabric of a plurality of virtual fabrics accessible through a Fibre Channel (FC) networking device;
   tagging, by the FCF device, the first traffic with the first virtual fabric identifier to provide tagged first traffic; and
   transmitting, by the FCF device via a second FCF device port to an FC networking device port of the FC networking device, the tagged first traffic.

18. The method of claim 17, further comprising:
   receiving, by the FCF device via the first FCF port and from the physical server device port, second traffic from a second virtual machine that is included in the plurality of virtual machines, wherein the second traffic includes a second virtual machine identifier that identifies the second virtual machine;
   determining, by the FCF device using the second virtual machine identifier and the virtual-machine-to-virtual-fabric mapping, that the second virtual machine identifier is associated with a second virtual fabric identifier that identifies a second virtual fabric of the plurality of virtual fabrics;
   tagging, by the FCF device, the second traffic with the second virtual fabric identifier to provide tagged second traffic; and
   transmitting, by the FCF device via the second FCF device port to the FC networking device port, the tagged second traffic.

19. The method of claim 17, further comprising:
   determining, by the FC networking device, using first virtual fabric identifier included in the tagged first traffic, that the first virtual fabric identifier identifies the first virtual fabric; and
   providing, by the FC networking device, the first traffic to the first virtual fabric.

20. The method of claim 17, further comprising:
   receiving, by the FCF device a first fabric discovery (FDISC) message from the server device;
   determining, by the FCF device, that the first FDISC message is a FDISC from the first virtual machine and, in response, transmit a second FDISC message with a virtual fabric bit unset to a default virtual fabric included in the plurality of virtual fabrics;
   receiving, by the FCF device, a first FDISC accept message (ACC) from the first virtual fabric through the default virtual fabric, wherein the FDISC accept message is tagged with the first virtual fabric identifier; and
   generating, by the FCF device, the virtual-machine-to-virtual-fabric mapping that includes the first virtual machine identifier that identifies the first virtual machine and that is associated with the first virtual fabric identifier.

* * * * *